(12) United States Patent
Rannard et al.

(10) Patent No.: US 12,448,467 B2
(45) Date of Patent: Oct. 21, 2025

(54) BRANCHED POLYMERS

(71) Applicant: The University of Liverpool, Liverpool (GB)

(72) Inventors: Steve Rannard, Liverpool (GB); Pierre Chambon, Liverpool (GB); Savannah Cassin, Liverpool (GB)

(73) Assignee: THE UNIVERSITY OF LIVERPOOL, Liverpool (GB)

( * ) Notice: Subject to any disclaimer, the term of this patent is extended or adjusted under 35 U.S.C. 154(b) by 0 days.

(21) Appl. No.: 16/608,072

(22) PCT Filed: Apr. 26, 2018

(86) PCT No.: PCT/GB2018/051106
§ 371 (c)(1),
(2) Date: Oct. 24, 2019

(87) PCT Pub. No.: WO2018/197885
PCT Pub. Date: Nov. 1, 2018

(65) Prior Publication Data
US 2020/0190237 A1 Jun. 18, 2020

(30) Foreign Application Priority Data
Apr. 26, 2017 (GB) .................................. 1706658

(51) Int. Cl.
*C08F 2/38* (2006.01)
*C08F 2/40* (2006.01)
(Continued)

(52) U.S. Cl.
CPC ................ *C08F 2/38* (2013.01); *C08F 12/36* (2013.01); *C08F 122/1006* (2020.02);
(Continued)

(58) Field of Classification Search
CPC .............. C08F 222/102; C08F 222/103; C08F 222/104; C08F 222/1025; C08F 222/1035;
(Continued)

(56) References Cited

U.S. PATENT DOCUMENTS 5,767,211 A * 6/1998 Guan ........................ C08F 2/38
526/171
6,313,251 B1 11/2001 Toh et al.
(Continued)

FOREIGN PATENT DOCUMENTS

CN 101538345 A 9/2009
JP 2007506822 A 3/2007
(Continued)

OTHER PUBLICATIONS

Graham, Susan et al "One-pot synthesis of methacrylic acid-ethyleneoxide branched block and graft copolymers" 2007 Journal of Materials Chemistry 17 545-552 (Year: 2007).*
(Continued)

*Primary Examiner* — Randy P Gulakowski
*Assistant Examiner* — David L Miller
(74) *Attorney, Agent, or Firm* — FOX ROTHSCHILD LLP

(57) ABSTRACT

A method of preparing a branched polymer comprises the free radical polymerisation of a multivinyl monomer in the presence of a chain transfer agent, using a source of radicals, wherein the extent of propagation is controlled relative to the extent of chain transfer to prevent gelation of the polymer. The average length of each vinyl polymer chain within the product is short.

15 Claims, 16 Drawing Sheets

(51) Int. Cl.
   *C08F 2/42*       (2006.01)
   *C08F 12/36*      (2006.01)
   *C08F 122/10*     (2006.01)
   *C08F 222/10*     (2006.01)
   *C08F 222/38*     (2006.01)
   *C08G 83/00*      (2006.01)
   *C08F 32/06*      (2006.01)
   *C08F 36/20*      (2006.01)
   *C08F 112/36*     (2006.01)
   *C08F 132/06*     (2006.01)
   *C08F 136/20*     (2006.01)
   *C08F 212/36*     (2006.01)
   *C08F 232/06*     (2006.01)
   *C08F 236/20*     (2006.01)

(52) U.S. Cl.
   CPC .... *C08F 222/102* (2020.02); *C08F 222/1063* (2020.02); *C08F 222/1067* (2020.02); *C08F 222/385* (2013.01); *C08G 83/005* (2013.01); *C08F 2/40* (2013.01); *C08F 2/42* (2013.01); *C08F 32/06* (2013.01); *C08F 36/20* (2013.01); *C08F 112/36* (2013.01); *C08F 132/06* (2013.01); *C08F 136/20* (2013.01); *C08F 212/36* (2013.01); *C08F 222/1025* (2020.02); *C08F 222/103* (2020.02); *C08F 222/1035* (2020.02); *C08F 222/104* (2020.02); *C08F 222/1045* (2020.02); *C08F 222/1055* (2020.02); *C08F 232/06* (2013.01); *C08F 236/20* (2013.01); *C08F 2438/00* (2013.01)

(58) Field of Classification Search
   CPC .......... C08F 222/1045; C08F 222/1055; C08F 222/105; C08F 222/385; C08F 2/38; C08F 122/1006; C08F 2/40; C08F 2/42; C08F 12/36; C08F 112/36; C08F 212/36; C08F 32/06; C08F 132/06; C08F 232/06; C08F 36/20; C08F 36/22; C08F 136/20; C08F 136/22; C08F 236/20; C08F 236/22; C08G 83/003; C08G 83/005; C08G 83/006
   See application file for complete search history.

(56) References Cited

U.S. PATENT DOCUMENTS

| | | | |
|---|---|---|---|
| 6,353,066 B1 | 3/2002 | Sosa | |
| 9,138,383 B1 | 9/2015 | Stansbury | |
| 2004/0247273 A1 | 12/2004 | Fabian et al. | |
| 2006/0287431 A1 | 12/2006 | Siol | |
| 2010/0010133 A1* | 1/2010 | Zook | C08G 75/12 524/391 |
| 2010/0130641 A1* | 5/2010 | Findlay | C08F 220/34 524/561 |
| 2011/0269904 A1 | 11/2011 | Bismarck et al. | |
| 2015/0266986 A1* | 9/2015 | Wang | A61L 26/008 424/618 |
| 2016/0266986 A1* | 9/2016 | Barak | G06F 11/142 |
| 2018/0021261 A1 | 1/2018 | Rannard et al. | |
| 2018/0051170 A1 | 2/2018 | Chikara | |

FOREIGN PATENT DOCUMENTS

| | | | |
|---|---|---|---|
| JP | 2009-190331 A | 8/2009 | |
| JP | 2012517493 A | 8/2012 | |
| JP | 2015147923 A * | 8/2015 | |
| KR | 10-2009-0111816 A | 10/2009 | |
| WO | 2008071662 A1 | 6/2008 | |
| WO | 2010/089575 A1 | 8/2010 | |
| WO | WO-2012036554 A1 * | 3/2012 | ............ C02F 1/4691 |
| WO | 2013005050 A1 | 1/2013 | |
| WO | 2016/147984 A1 | 9/2016 | |
| WO | 2018197884 A1 | 11/2018 | |
| WO | 2018197885 A1 | 11/2018 | |
| WO | 2020089649 A1 | 5/2020 | |

OTHER PUBLICATIONS

Besenius, et al: "Synthesis and characterization of water-soluble densely branched glycopolymers", Reactive & Functional Polymers, 68 (2008), pp. 1524-1533.

Isaure, et al: "Facile synthesis of branched water-soluble poly(dimethylacrylamide)s in conventional and parallel reactors using free radical polymerisation", Reactive & Functional Polymers, 66 (2006), pp. 65-79.

Isaure, et al: "Synthesis of Branched Poly(methyl methacrylate)s: Effect of the Branching Comonomer Structure", Macromolecules, 2004, 37, pp. 2096-2105.

McEwan, et al: "Combining catalytic chain transfer polymerisation (CCTP) and thio-Michael addition: enabling the synthesis of peripherally functionalised branched polymers", Polymer Chemistry, 2011, 2, 1992.

O'Brien, et al: "Facile, versatile and cost effective route to branched vinyl polymers", Polymer, 41 (2000), pp. 6027-6031.

Wu, et al: "Synthesis Backbone-Dual-Responsive of Hyperbranched Poly(bis(N, N-ethyl acrylamide))s by Raft", Macromolecular Research, 2014, vol. 22, No. 11, pp. 1196-1202, DOI: 10.1007/s13233-014-2166-y.

Besenius et al., "Synthesis and characterization of water-soluble densely branched glycopolymers," Reactive & Functional Polymers (2008); 68:1524-1533.

Isaure et al., "Facile synthesis of branched water-soluble poly(dimethylacrylamide)s in conventional and parallel reactors using free radical polymerisation," Reactive & Functional Polymers (2006); 66:65-79.

Isaure et al., "Synthesis of Branched Poly(methyl methacrylate)s: Effect of the Branching Comonomer Structure," Macromolecules (2004); 37:2096-2105.

McEwan et al., "Combining catalytic chain transfer polymerisation (CCTP) and thio-Michael addition: enabling the synthesis of peripherally functionalized branched polymers," Polym. Chem., (2011); 2:1992-1999.

O'Brien et al., "Facile, versatile and cost effective route to branched vinyl polymers," Polymer (2000); 41:6027-6031.

Wu et al., "Synthesis Backbone-Dual-Responsive of Hyperbranched Poly(bis(N,N-ethyl acrylamide)s by Raft," Macromolecular Research (2014); 22(11):1196-1202.

* cited by examiner

BRANCHED POLYMERS

FIELD OF THE INVENTION

The present invention relates to branched polymers and methods of preparing them. In particular the present invention relates to polymers prepared by free radical reactions involving vinyl-containing monomers.

BACKGROUND OF THE INVENTION

Many different types of branched polymers, and many different ways of preparing branched polymers, are known.

Some branched polymers are cross-linked or gelled, whereas others are soluble and non-gelled. The present invention is generally concerned with polymers which fall within the latter group.

The properties and potential applications of branched polymers are governed by several characteristics including the architecture of the polymers, the type of monomers from which they are made, the type of polymerisation, the level of branching, the functional groups on the polymers, the use of other reagents, and the conditions under which polymerisation is carried out. These characteristics can in turn affect the hydrophobicity of the polymers or parts of them, viscosity, solubility, and the form and behaviour of the polymers on a nanoparticulate level, in bulk and in solution.

Various methods have been used to achieve controlled levels of branching within vinyl polymers in order to avoid extensive cross-linking and gelation. For example, the "Strathclyde route", as described in N. O'Brien, A. McKee, D. C. Sherrington, A. T. Slark, A. Titterton, *Polymer* 2000, 41, 6027-6031 involves the controlled radical polymerisation of predominantly monofunctional vinyl monomer in the presence of lower levels of difunctional (di) vinyl monomer and chain transfer agent. In other methods, the use of controlled or living polymerisation removes the need for chain transfer agent. In general, gelation can be avoided if a vinyl polymer made from predominantly a monofunctional monomer is branched by virtue of a difunctional vinyl monomer so that there is on average one branch or fewer per vinyl polymer chain, as disclosed, for example, in WO 2009/122220, WO 2014/199174 and WO 2014 199175.

A further example of a soluble branched polymer is disclosed in T. Sato, H. Ihara, T. Hirano, M. Seno, *Polymer* 2004, 45, 7491-7498. This uses high concentrations of initiator and copolymerises a divinyl monomer (ethylene glycol dimethacrylate—EGDMA) with a monovinyl monomer (N-methylmethacrylamide).

Another way of controlling branching is described in T. Zhao, Y. Zheng, J. Poly, W. Wang, *Nature Communications* 2013, 10.1038/ncomm2887, and Y. Zheng, H. Cao, B. Newland, Y. Dong, A. Pandit, W. Wang; *J. Am. Chem. Soc.* 2011, 133, 13130-13137. This uses deactivation-enhanced atom transfer radical polymerisation (DE-ATRP). Oligomers made from divinyl monomers react with each other whilst they still have small chain lengths, thereby avoiding intramolecular cyclisation which can occur with longer active chains.

Whilst this allows the formation of hyperbranched polymers, there are several disadvantages associated with this method. A metallic catalytic system and large amounts of an initiator are required. Much of the vinyl functionality remains in the final product. The polymerisation must be terminated at low vinyl conversion to prevent gelation. Stringent purification of the final material is required.

T. Sato, Y. Arima, M. Seno, T. Hirano; *Macromolecules* 2005, 38, 1627-1632 discloses the homopolymerisation of a divinyl monomer using a large amount of initiator. Whilst this yields soluble hyperbranched polymers, the functionality of the polymer depends to a significant extent on the initiator, a large amount of which is incorporated. Furthermore, double bonds remain in the product. The polymerisation must be terminated at low vinyl conversion to prevent gelation.

SUMMARY OF THE INVENTION

As a result of further experimentation a new method of polymerisation was discovered and is disclosed herein, which results in a new type of polymer architecture and which addresses several of the issues associated with known polymerisation methods.

From a first aspect the present invention provides a method of preparing a branched polymer comprising the free radical polymerisation of a multivinyl monomer in the presence of a chain transfer agent, using a source of radicals, wherein the extent of propagation is controlled relative to the extent of chain transfer to prevent gelation of the polymer.

The term multivinyl monomer denotes monomers which have more than one free radical polymerisable vinyl group. One particular class of such monomers are those which have two such vinyl groups, i.e. divinyl monomers.

Therefore, from a further aspect the present invention provides a method of preparing a branched polymer comprising the free radical polymerisation of a divinyl monomer in the presence of a chain transfer agent, using a source of radicals, wherein the extent of propagation is controlled relative to the extent of chain transfer to prevent gelation of the polymer.

Thus, in contrast to some prior art methods, cross-linking and insolubility are avoided not by using a combination of a predominant amount of monovinyl monomer and a lesser amount of divinyl monomer, but instead by controlling the way in which a divinyl monomer, or other multivinyl monomer, reacts.

The polymer contains a multiplicity of vinyl polymer chain segments, and controlling the amount or rate of chain transfer relative to the amount or rate of propagation affects the average length of those vinyl polymer chains.

Therefore, from a further aspect the present invention provides a method of preparing a branched polymer comprising the free radical polymerisation of a divinyl monomer in the presence of a chain transfer agent, using a source of radicals, wherein propagation is controlled relative to chain transfer to achieve a polymer having a multiplicity of vinyl polymer chain segments wherein the average number of divinyl monomer residues per vinyl polymer chain is between 1 and 3.

From a further aspect the present invention provides a method of preparing a branched polymer comprising the free radical polymerisation of a multivinyl monomer in the presence of a chain transfer agent, using a source of radicals, wherein propagation is controlled relative to chain transfer to achieve a polymer having a multiplicity of vinyl polymer chain segments wherein the average number of multivinyl monomer residues per vinyl polymer chain is between 1 and 3.

From a further aspect the present invention provides a method of preparing a branched polymer comprising the free radical polymerisation of a trivinyl monomer in the presence of a chain transfer agent, using a source of radicals, wherein propagation is controlled relative to chain transfer to achieve a polymer having a multiplicity of vinyl polymer chain segments wherein the average number of trivinyl monomer residues per vinyl polymer chain is between 1 and 2.

From a further aspect the present invention provides a method of preparing a branched polymer comprising the free radical polymerisation of a tetravinyl monomer in the presence of a chain transfer agent, using a source of radicals, wherein propagation is controlled relative to chain transfer to achieve a polymer having a multiplicity of vinyl polymer chain segments wherein the average number of tetravinyl monomer residues per vinyl polymer chain is between 1 and 1.7.

Any suitable source of radicals can be used for the free radical polymerisation. For example, this could be an initiator such as AIBN. A thermal or photochemical or other process can be used to provide free radicals.

In contrast to some prior art methods, a large amount of initiator is not required; only a small amount of a source of radicals is required in order to initiate the reaction.

The skilled person is able to control the chain transfer reaction relative to the propagation reaction by known techniques. This may be done by using a sufficiently large amount of a chain transfer agent (CTA). The chain transfer agent caps the vinyl polymer chains and thereby limits their length. It also controls the chain end chemistry. Various chain transfer agents are suitable and of low cost, and impart versatility to the method and resultant product.

The primary chains are kept very short so that gel formation is avoided, whilst at the same time a high level of branching is achieved.

BRIEF DESCRIPTION OF THE FIGURES

The present invention will now be described in further non-limiting detail and with reference to the drawings in which.

DETAILED DESCRIPTION OF THE INVENTION

Figure 1:
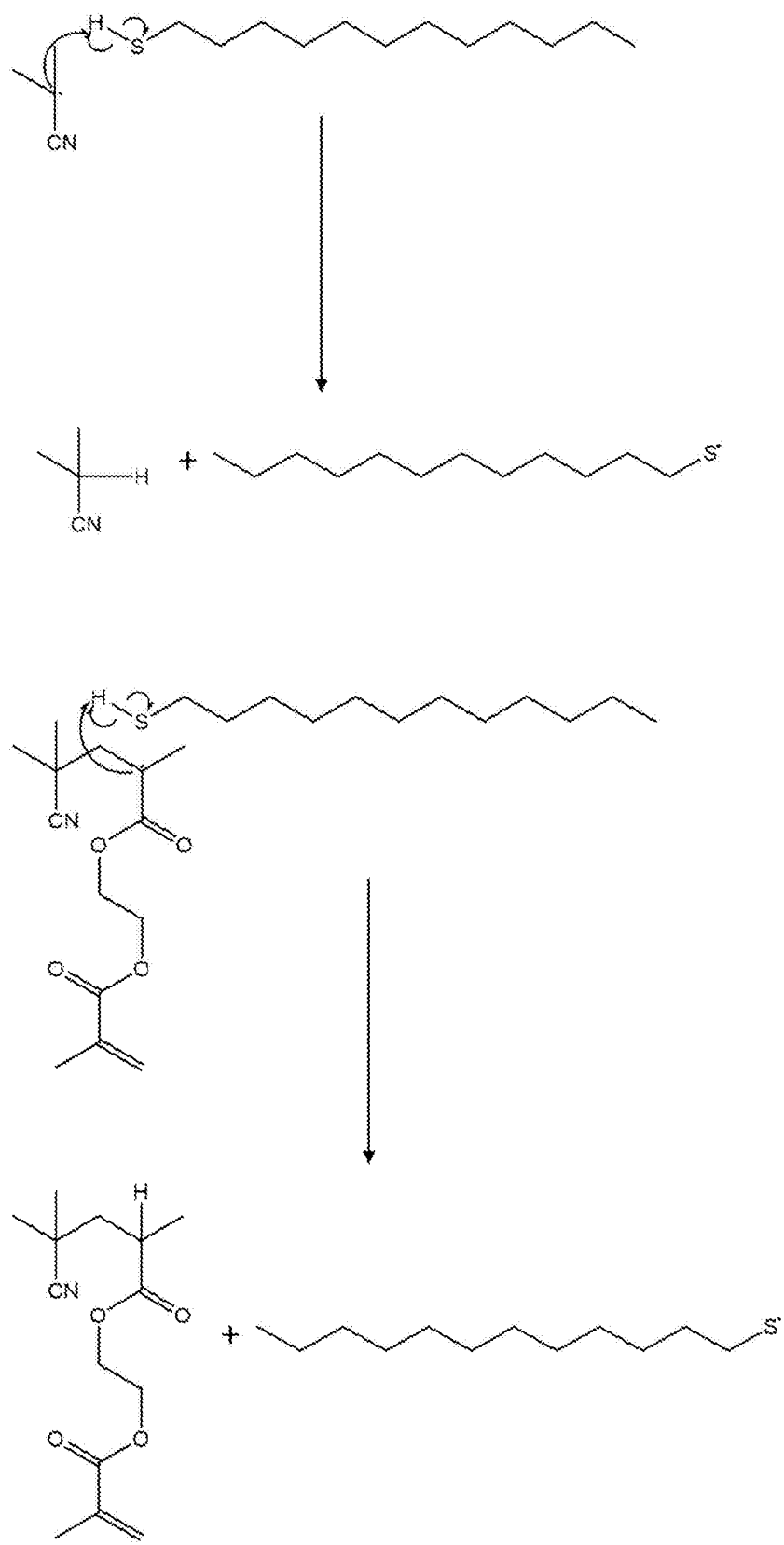
FIGS. 1 and 2 show free radical mechanisms involved in one embodiment of the present invention.

An important advantage of the present invention is that industrial free radical polymerisation is used. This is completely scalable, very straightforward and extremely cost effective. In contrast, some prior art methods are based on controlled or living polymerisation and/or require the use of initiator systems or more complex purification procedures.

Optionally the only reagents used in the method of the present invention are one or more multivinyl monomer (for example a divinyl monomer), a chain transfer agent, a source of radicals, and optionally a solvent. Thus, in contrast to some prior art methods, the present invention allows the homopolymerisation of multivinyl monomers.

Monovinyl monomers are not required in the method of the present invention.

Optionally, however, monovinyl monomers may be used, i.e. optionally a copolymerisation may be carried out. For example, the method may comprise the incorporation of not only a divinyl monomer but also an amount, optionally a lesser amount, of monovinyl monomer. The molar amount of divinyl monomer relative to monovinyl monomer may be greater than 50%, greater than 75%, greater than 90% or greater than 95%, for example. Optionally, the ratio of divinyl monomer residues to monovinyl monomer residues may be greater than or equal to 1:1, or greater than or equal to 3:1, greater than or equal to 10:1 or greater than or equal to 20:1.

Alternatively, in some scenarios, more monovinyl monomer may be used. Optionally, the method may comprise the incorporation of not only one or more divinyl monomer but also monovinyl monomer, wherein for example 20% or more, 30% or more, 40% or more, 50% or more, 60% or more, 70% or more, 80% or more, 90% or more, or 95% or more, of the vinyl monomers used are divinyl monomers. Optionally, the method may comprise the incorporation of not only one or more divinyl monomer but also monovinyl monomer, wherein for example 20% or more, 30% or more, 40% or more, 50% or more, 60% or more, 70% or more, 80% or more, 90% or more, or 95% or more, of the vinyl monomers residues in the product are divinyl monomer residues.

The possible incorporation of monovinyl monomers is applicable not just with divinyl monomers but also with other types of multivinyl monomers. Accordingly, the method may comprise the incorporation of not only one or more multivinyl monomer but also monovinyl monomer, wherein for example 10% or more, 20% or more, 30% or more, 40% or more, 50% or more, 60% or more, 70% or more, 80% or more, 90% or more, or 95% or more, of the vinyl monomers used are multivinyl monomers. Optionally, the method may comprise the incorporation of not only one or more multivinyl monomer but also monovinyl monomer, wherein for example 10% or more, 20% or more, 30% or more, 40% or more, 50% or more, 60% or more, 70% or more, 80% or more, 90% or more, or 95% or more, of the vinyl monomers residues in the product are multivinyl monomer residues.

Divinyl Monomer

One type of multivinyl monomer which may be used in the present invention is a divinyl monomer.

The divinyl monomer contains two double bonds each of which is suitable for free radical polymerisation. It may contain one or more other group which for example may be selected from, but not limited to: aliphatic chains; esters; amides; esters; urethanes; silicones; amines; aromatic groups; oligomers or polymers; or a combination of one or more of these; and/or which may optionally be substituted. For example there may be PEG groups or PDMS groups between the double bonds, or a benzene ring (e.g. as in the monomer divinyl benzene) or other aromatic groups.

Each vinyl group in the divinyl monomer may for example be an acrylate, methacrylate, acrylamide, methacrylamide, vinyl ester, vinyl aliphatic, or vinyl aromatic (e.g. styrene) group.

Due to the large amount of chain transfer agent in the reaction, the vinyl polymer chains in the final product are generally quite short and the chemistry of the longest chains in the polymer may be governed by the other chemical species in the monomer. Thus, for example, monomers which contain, in addition to two vinyl groups, ester linkages (e.g. dimethacrylates, such as EGDMA) polymerise to form polyester structures, wherein the longest repeating units comprise esters. Similarly, monomers which contain, in addition to two vinyl groups, amide linkages (e.g. bisacrylamides) polymerise to form polyamide structures, wherein the longest repeating units comprise amides.

Thus the present invention opens up new ways of making polyesters, polyamides or other polymers, allowing the formation of different types of architecture to those previously considered possible.

The divinyl monomer may be stimuli-responsive, e.g. may be pH, thermally, or biologically responsive. The response may be degradation. The linkage between the two double bonds may for example be acid- or base-cleavable, for example may contain an acetal group. This allows the preparation of a commercial product which is a stimuli-responsive branched polymer. Alternatively the method of the present invention may comprise a further step of cleaving divinyl monomer to remove bridges in the polymer, such that the commercial product is one in which the linkages between vinyl polymer chains have been removed or reduced.

Optionally a mixture of divinyl monomers may be used. Thus two or more different divinyl monomers may be copolymerised.

Other Types of Multivinyl Monomer

Multivinyl monomers other than divinyl monomers may be used, for example, trivinyl monomers, tetravinyl monomers and/or monomers with more vinyl groups. Trivinyl monomers, in particular, are useful, as they can be sourced or prepared without significant difficulty, and allow further options for producing different types of branched polymers. The discussion, disclosures and teachings herein in relation to divinyl monomers also apply where appropriate, mutatis mutandis, to other multivinyl monomers.

Chain Transfer Agent (CTA)

Any suitable chain transfer agent may be used.

These include thiols, including optionally substituted aliphatic thiols, such as dodecane thiol (DDT). Another suitable chain transfer agent is alpha-methylstyrene dimer. Another is 2-isopropoxyethanol. Other compounds having functionality which is known to allow the transfer of radical chains may be used. These can be bespoke to bring about desired functionality to the polymers.

The chain-end chemistry can be tailored by the choice of CTA. Thus, hydrophobic/hydrophilic behaviour and other properties can be influenced. Alkyl thiols can have quite different properties to alcohol-containing groups, acid-containing groups, or amine-containing groups, for example.

Optionally, a mixture of CTAs may be used. Thus, two or more different CTAs may be incorporated into the product.

Relative Amounts of Chain Transfer Agent and Divinyl Monomer

The relative amounts of chain transfer agent and divinyl monomer can be modified easily and optimised by routine procedures to obtain non-gelled polymers without undue burden to the skilled person. The analysis of the products can be carried out by routine procedures, for example the relative amounts of chain transfer agent and divinyl monomer can be determined by NMR analysis.

Regarding the reagents used, optionally at least 1 equivalent, or between 1 and 10 equivalents, or between 1.2 and 10 equivalents, or between 1.3 and 10 equivalents, or between 1.3 and 5 equivalents, or between 1 and 5 equivalents, or between 1 and 3 equivalents, or between 1 and 2 equivalents, or between 1.2 and 3 equivalents, or between 1.2 and 2 equivalents, of chain transfer agent may be used relative to divinyl monomer. The presence of a large amount of chain transfer agent means that on average the primary vinyl polymer chains react, and are capped by, chain transfer agent, whilst they are short. This procedure amounts to telomerisation, i.e. the formation of short chains with small numbers of repeat units.

In the final product, there may be n+1 chain transfer agent moieties per n divinyl monomer moieties (thus tending to a 1:1 ratio as the molecular weight increases): this is based on a scenario where a theoretically ideal macromolecule of finite size is formed. Other scenarios are however possible, for example intramolecular loop reactions may occur or initiator may be incorporated: in practice, therefore, ratios other than (n+1): n are possible. Optionally, on average between 0.5 and 2 chain transfer agent moieties are present per divinyl monomer moiety, optionally between 0.7 and 1.5, optionally between 0.75 and 1.3, or between 0.8 and 1.2, or between 0.9 and 1.1, or between 1 and 1.05, or approximately 1.

Without wishing to be bound by theory, the (n+1): n relationship of this idealized scenario can be rationalized as follows. There may be one chain transfer agent per vinyl polymer chain (e.g. if the chain transfer agent is a thiol ("RSH") then an RS. radical is incorporated at one end of the chain and a H. radical at the other). The simplest theoretical product contains a single divinyl monomer wherein each of the two double bonds is capped by a chain transfer agent (such that each of the two double bonds can be considered a vinyl polymer chain having a length of only one vinyl group). Thus, in this simplest theoretical product there is one more chain transfer agent than divinyl monomer (2 vs. 1). For each additional propagation (i.e. for each further divinyl monomer which is incorporated) there needs to be one further chain transfer agent incorporated if there is to be a product of finite size and if there is to be no intramolecular crosslinking: this is because one double bond of the further divinyl monomer can be incorporated into one existing chain which does not need further chain transfer agent, whereas the other double bond of the further divinyl monomer requires a further chain transfer agent to cap it.

Therefore, according to this theoretical assessment, some examples of the ratio of chain transfer agent residues to divinyl monomer residues in the product are as follows:

| Number of DVMs in the polymer (n) | Equivalents of CTA per DVM in the polymer product [(n + 1)/n] |
| --- | --- |
| 1 | (1 + 1)/1 = 2 |
| 2 | (2 + 1)/2 = 1.5 |
| 3 | (3 + 1)/3 = 1.33 |
| 5 | (5 + 1)/5 = 1.2 |
| 10 | (10 + 1)/10 = 1.1 |
| 20 | (20 + 1)/20 = 1.05 |
| 50 | (50 + 1)/50 = 1.02 |
| 100 | (100 + 1)/100 = 1.01 |

It can be seen that the ratio of CTA:DVM tends towards 1 as the molecular weight increases.

Relative Amounts of Chain Transfer Agent and Trivinyl Monomer

Where the multivinyl monomer used is a trivinyl monomer, the following may optionally apply.

Regarding the reagents used, optionally at least 2 equivalents, or between 2 and 20 equivalents, or between 2.4 and 20 equivalents, or between 2.6 and 20 equivalents, or between 2.6 and 10 equivalents, or between 2 and 10 equivalents, or between 2 and 6 equivalents, or between 2 and 4 equivalents, or between 2.4 and 6 equivalents, or between 2.4 and 4 equivalents, of chain transfer agent may be used relative to trivinyl monomer.

In the final product, there may be 2n+1 chain transfer agent moieties per n trivinyl monomer moieties (thus tending to a 2:1 ratio as the molecular weight increases): this is based on a scenario where a theoretically ideal macromolecule of finite size is formed. Other scenarios are however possible, for example intramolecular loop reactions may occur or initiator may be incorporated: in practice, therefore, ratios other than (2n+1): n are possible. Optionally, on average between 1 and 4 chain transfer agent moieties are present per trivinyl monomer moiety, optionally between 1.4 and 3, optionally between 1.5 and 2.6, or between 1.6 and 2.4, or between 1.8 and 2.2, or between 2 and 2.1, or approximately 2.

Without wishing to be bound by theory, the (2n+1): n relationship of this idealized scenario can be rationalized as follows. There may be one chain transfer agent per vinyl polymer chain (e.g. if the chain transfer agent is a thiol ("RSH") then an RS. radical is incorporated at one end of the chain and a H. radical at the other). The simplest theoretical product contains a single trivinyl monomer wherein each of the three double bonds is capped by a chain transfer agent (such that each of the three double bonds can be considered a vinyl polymer chain having a length of only one vinyl group). Thus, in this simplest theoretical product there are two more chain transfer agents than trivinyl monomer (3 vs. 1). For each additional propagation (i.e. for each further trivinyl monomer which is incorporated) there needs to be two further chain transfer agents incorporated if there is to be a product of finite size and if there is to be no intramolecular crosslinking: this is because one double bond of the further trivinyl monomer can be incorporated into one existing chain which does not need further chain transfer agent, whereas the other two double bonds of the further trivinyl monomer each require a further chain transfer agent to cap them.

Therefore, according to this theoretical assessment, some examples of the ratio of chain transfer agent residues to trivinyl monomer residues in the product are as follows:

| Number of TVMs in the polymer (n) | Equivalents of CTA per TVM in the polymer product [(2n + 1)/n] |
|---|---|
| 1 | (2 + 1)/1 = 3 |
| 2 | (4 + 1)/2 = 2.5 |
| 3 | (6 + 1)/3 = 2.33 |
| 5 | (10 + 1)/5 = 2.2 |
| 10 | (20 + 1)/10 = 2.1 |
| 20 | (40 + 1)/20 = 2.05 |
| 50 | (100 + 1)/50 = 2.02 |
| 100 | (200 + 1)/100 = 2.01 |

It can be seen that the ratio of CTA:trivinyl monomer tends towards 2 as the molecular weight increases.

Relative Amounts of Chain Transfer Agent and Tetravinyl Monomer

Where the multivinyl monomer used is a tetravinyl monomer, the following may optionally apply.

Regarding the reagents used, optionally at least 3 equivalents, or between 3 and 30 equivalents, or between 3.6 and 30 equivalents, or between 3.9 and 30 equivalents, or between 3.9 and 15 equivalents, or between 3 and 15 equivalents, or between 3 and 9 equivalents, or between 3 and 6 equivalents, or between 3.6 and 9 equivalents, or between 3.6 and 6 equivalents, of chain transfer agent may be used relative to tetravinyl monomer.

In the final product, there may be 3n+1 chain transfer agent moieties per n tetravinyl monomer moieties (thus tending to a 3:1 ratio as the molecular weight increases): this is based on a scenario where a theoretically ideal macromolecule of finite size is formed. Other scenarios are however possible, for example intramolecular loop reactions may occur or initiator may be incorporated: in practice, therefore, ratios other than (3n+1): n are possible. Optionally, on average between 1.5 and 6 chain transfer agent moieties are present per tetravinyl monomer moiety, optionally between 2.1 and 4.5, optionally between 2.25 and 3.9, or between 2.4 and 3.6, or between 2.7 and 3.3, or between 3 and 3.15, or approximately 3.

Without wishing to be bound by theory, the (3n+1): n relationship of this idealized scenario can be rationalized as follows. There may be one chain transfer agent per vinyl polymer chain (e.g. if the chain transfer agent is a thiol ("RSH") then an RS. radical is incorporated at one end of the chain and a H. radical at the other). The simplest theoretical product contains a single tetravinyl monomer wherein each of the four double bonds is capped by a chain transfer agent (such that each of the four double bonds can be considered a vinyl polymer chain having a length of only one vinyl group). Thus, in this simplest theoretical product there are three more chain transfer agents than tetravinyl monomer (4 vs. 1). For each additional propagation (i.e. for each further tetravinyl monomer which is incorporated) there need to be three further chain transfer agents incorporated if there is to be a product of finite size and if there is to be no intramolecular crosslinking: this is because one double bond of the further tetravinyl monomer can be incorporated into one existing chain which does not need further chain transfer agent, whereas the other three double bonds of the further tetravinyl monomer each require a further chain transfer agent to cap them.

Therefore, according to this theoretical assessment, some examples of the ratio of chain transfer agent residues to tetravinyl monomer residues in the product are as follows:

| Number of tetravinyl monomers in the polymer (n) | Equivalents of CTA per tetravinyl monomer in the polymer product [(3n + 1)/n] |
|---|---|
| 1 | (3 + 1)/1 = 4 |
| 2 | (6 + 1)/2 = 3.5 |
| 3 | (9 + 1)/3 = 3.33 |
| 5 | (15 + 1)/5 = 3.2 |
| 10 | (30 + 1)/10 = 3.1 |
| 20 | (60 + 1)/20 = 3.05 |
| 50 | (150 + 1)/50 = 3.02 |
| 100 | (300 + 1)/100 = 3.01 |

It can be seen that the ratio of CTA:tetrtavinyl monomer tends towards 3 as the molecular weight increases.

Relative Amounts of Chain Transfer Agent and Multivinyl Monomer

Numerical relationships and theoretical assessments have been presented above for each of divinyl monomers, trivinyl monomers and tetravinyl monomers.

In summary, without wishing to be bound by theory, in certain idealised scenarios the number of CTA residues per n MVM residues in the final product may be as follows:

|  | Number of CTA residues per n MVM residues in final product | as n tends to infinity, the ratio tends towards |
|---|---|---|
| Divinyl monomer | n + 1 | 1:1 |
| Trivinyl monomer | 2n + 1 | 2:1 |
| Tetravinyl monomer | 3n + 1 | 3:1 |

Thus it can be seen that, as the valency of the monomwer increases, more and more CTA is required to be present in the final product to cap the chains, unless some other mechanism (e.g. intramolecular reaction) does that.

In general the following may optionally apply across the various types of multivinyl monomers discussed herein. Regarding the reagents used, optionally at least 1 equivalent, or between 1 and 30 equivalents, or between 1.2 and 30 equivalents, or between 1.3 and 30 equivalents, or between 1.3 and 15 equivalents, or between 1 and 15 equivalents, or between 1 and 9 equivalents, or between 1 and 6 equivalents, or between 1.2 and 9 equivalents, or between 1.2 and 6 equivalents, of chain transfer agent may be used relative to multivinyl monomer. In the final product, optionally, on average between 0.5 and 6 chain transfer agent moieties are present per multivinyl monomer moiety, optionally between 0.7 and 4.5, optionally between 0.75 and 3.9, or between 0.8 and 3.6, or between 0.9 and 3.3, or between 1 and 3.15, or between approximately 1 and approximately 3.

Extent of Vinyl Polymerization

We believe that one important feature of the method of the present invention is that the average length of the vinyl polymer chains within the overall polymer is short. A typical polymeric molecule prepared in accordance with the present invention will contain many vinyl polymer chains (each of which is on average quite short) linked together by the moiety which in the multivinyl monomer is between the double bonds.

This is achieved by adjusting the conditions, including the amount of chain transfer agent, so that the rate of chain transfer competes with the rate of vinyl polymerization to the desired extent. The identities of the multivinyl monomer and the chain transfer agent, as well as other factors, affect this balance, but the progress of the reaction can be easily monitored and the properties of the resultant polymer easily determined, by known, routine, techniques. Therefore there is no undue burden to the skilled person in carrying out a method in accordance with the present invention, or in determining which methods fall within the scope of the present invention. The resulting chain length in this context is the kinetic chain length.

Extent of Vinyl Polymerisation when Using Divinyl Monomers

The number of propagation steps (i.e. how many divinyl monomers are added) before each chain transfer (i.e. termination of the growing vinyl polymer chain) needs to be high enough to generate a branched polymer but low enough to prevent gelation. It appears that an average vinyl polymer chain length of between 1 and 3, between 1 and 2.5, between 1 and 2.2, between 1 and 2, between 1.3 and 2, between 1.5 and 2, between 1.7 and 2, between 1.8 and 2, between 1.9 and 2, or between 1.95 and 2, or of approximately 2, divinyl monomer residues, is suitable.

Whilst the average may optionally be between 1 and 3, a small number of vinyl polymer chains may contain significantly more divinyl monomer residues, for example as many as 10, 15, 18, 20 or more.

Optionally 90% of the vinyl polymer chains contain fewer than 10 DVM residues, or 90% have a length of 7 or fewer, or 90% have a length of 5 or fewer, or 95% have a length of 15 or fewer, or 95% have a length of 10 or fewer, or 95% have a length of 7 or fewer, or 75% have a length of 10 or fewer, or 75% have a length of 7 or fewer, or 75% have a length of 5 or fewer, or 75% have a length of 4 or fewer, or 75% have a length of 3 or fewer.

Without wishing to be bound by theory, the average vinyl polymer chain length, or kinetic chain length, in a scenario which assumes that there is no intramolecular reaction, can be calculated as follows. If, as discussed above there are n+1 chain transfer agent moieties per n divinyl monomer moieties, and one chain transfer agent per vinyl polymer chain, then, because there are 2n double bonds per n divinyl monomers, the number of double bond residues per chain will on average be 2n/(n+1) which will tend towards 2 as the molecular weight increases.

Therefore, according to this theoretical assessment, some examples of average vinyl chain length are as follows:

| Number of DVMs in the polymer (n) | Average number of DVM residues per vinyl polymer chain [2n/(n + 1)] |
|---|---|
| 1 | (2 × 1)/(1 + 1) = 1 |
| 2 | (2 × 2)/(2 + 1) = 1.33 |
| 3 | (2 × 3)/(3 + 1) = 1.5 |
| 5 | (2 × 5)/(5 + 1) = 1.67 |
| 10 | (2 × 10)/(10 + 1) = 1.82 |
| 20 | (2 × 20)/(20 + 1) = 1.90 |
| 50 | (2 × 50)/(50 + 1) = 1.96 |
| 100 | (2 × 100)/(100 + 1) = 1.98 |

It can be seen that the range, for the average kinetic chain length under certain theoretical conditions, is between 1 and 2. In pratceice the value may fall outside this range: other reactions, for example intramolecular polymerisation, may occur.

The skilled person will understand that the process makes a range of products which, depending on the conditions, can include low molecular weight products (the smallest being the product containing just one DVM, i.e. wherein the vinyl chain length is 1) up to high molecular weight products. Whether the product mixture is purified, and how it is purified, will of course affect the composition of the product and accordingly the length of vinyl polymer chains present. Thus, in some scenarios, where lower molecular weight products are removed, the average vinyl polymer chain length in the resultant purified product may be higher.

Empirically, the appropriate extent of polymerization has been determined by 1) taking a representative monofunctional monomer that resembles the multifunctional monomer chemically, 2) taking the CTA of interest, 3) conducting a range of linear polymerizations at varying CTA/monomer ratios, 4) analysing the products and 5) determining the average chain length.

Amongst the DVMs which we have used are DVMs which contain cleavable groups between the two vinyl groups. These not only enable interesting and commercially useful products to be prepared but also allow the extent of vinyl polymerisation to be investigated.

As exemplified below, we have carried out polymerisations with degradable DVMs then subjected the products to conditions which have cleaved the DVMs. This breaks the bridges within the branched vinyl polymer to result in a series of linear vinyl chains. Analysis of these shows the distribution of vinyl polymer chain lengths which are formed by the process of the present invention. Interestingly, reaction of analogous monovinyl monomers gives very similar chain length distributions. This supports the theoretical analysis outlined above, shows that the process can be tailored, and implies that polymerisation can proceed effectively regardless of whether DVM is homopolymerised or DVM is polymerised with some monovinyl monomer present.

Optionally, the product may contain a large amount of divinyl monomer residues wherein one of the double bond residues is capped with a chain transfer agent (as opposed to being part of a chain), i.e. has a nominal chain length of 1. The other double bond residues of those divinyl monomer residues may be part of a longer chain. This may be the most common form of the vinyl residue in the product. Optionally the most common vinyl "chain" is that which contains only one divinyl monomer residue. Optionally the two most common vinyl chains are (i) the vinyl "chain" which contains only one divinyl monomer residue and (ii) a vinyl chain which contains an integer selected from between 2 and 8, e.g. between 2 and 7, e.g. between 2 and 6, e.g. between 3 and 8, e.g. between 3 and 7, e.g. between 3 and 6, e.g. between 3 and 5, e.g. 4 or 5, e.g. 5, divinyl monomer residues. Optionally the most common vinyl "chain" is that which contains only one divinyl monomer residue, and the second most common vinyl chain contains an integer selected from between 2 and 8, e.g. between 2 and 7, e.g. between 2 and 6, e.g. between 3 and 8, e.g. between 3 and 7, e.g. between 3 and 6, e.g. between 3 and 5, e.g. 4 or 5, e.g. 5, divinyl monomer residues. Optionally the distribution of chain lengths may be bimodal, e.g. the maxima may be at chain length 1 and at a second chain length which may optionally be between 3 and 8, e.g. between 3 and 7, e.g. between 3 and 6, e.g. between 3 and 5, e.g. 4 or 5, e.g. 5.

Extent of Vinyl Polymerisation when Using Trivinyl Monomers

The number of propagation steps (i.e. how many trivinyl monomers are added) before each chain transfer (i.e. termination of the growing vinyl polymer chain) needs to be high enough to generate a branched polymer but low enough to prevent gelation. It appears that an average vinyl polymer chain length of between 1 and 2, between 1 and 1.8, between 1 and 1.7, between 1 and 1.5, between 1.1 and 1.5, between 1.2 and 1.5, between 1.25 and 1.5, between 1.3 and 1.5, between 1.4 and 1.5, or between 1.45 and 1.5, or of approximately 1.5, trivinyl monomer residues, is suitable.

Whilst the average may optionally be between 1 and 2, a small number of vinyl polymer chains may contain significantly more trivinyl monomer (TVM) residues, for example as many as 5, 10, 15, 18, 20 or more.

Optionally 90% of the vinyl polymer chains contain fewer than 8 TVM residues, or 90% have a length of 5 or fewer, or 90% have a length of 4 or fewer, or 95% have a length of 10 or fewer, or 95% have a length of 8 or fewer, or 95% have a length of 5 or fewer, or 75% have a length of 8 or fewer, or 75% have a length of 6 or fewer, or 75% have a length of 4 or fewer, or 75% have a length of 3 or fewer, or 75% have a length of 2 or fewer.

Without wishing to be bound by theory, the average vinyl polymer chain length, or kinetic chain length, in a scenario which assumes that there is no intramolecular reaction, can be calculated as follows. If, as discussed above there are $2n+1$ chain transfer agent moieties per n trivinyl monomer moieties, and one chain transfer agent per vinyl polymer chain, then, because there are $3n$ double bonds per $n$ trivinyl monomers, the number of double bond residues per chain will on average be $3n/(2n+1)$ which will tend towards 1.5 as the molecular weight increases.

Therefore, according to this theoretical assessment, some examples of average vinyl chain length are as follows:

| Number of TVMs in the polymer (n) | Average number of TVM residues per vinyl polymer chain [$3n/(2n + 1)$] |
|---|---|
| 1 | $(3 \times 1)/(2 + 1) = 1$ |
| 2 | $(3 \times 2)/(4 + 1) = 1.2$ |
| 3 | $(3 \times 3)/(6 + 1) = 1.29$ |
| 5 | $(3 \times 5)/(10 + 1) = 1.36$ |
| 10 | $(3 \times 10)/(20 + 1) = 1.43$ |
| 20 | $(3 \times 20)/(40 + 1) = 1.46$ |
| 50 | $(3 \times 50)/(100 + 1) = 1.49$ |
| 100 | $(3 \times 100)/(200 + 1) = 1.49$ |

It can be seen that the range, for the average kinetic chain length inder certain theoretical conditions, is between 1 and 1.5. In practice the value may fall outside this range: other reactions, for example intramolecular polymerisation, may occur.

The skilled person will understand that the process makes a range of products which, depending on the conditions, can include low molecular weight products (the smallest being the product containing just one TVM, i.e. wherein the vinyl chain length is 1) up to high molecular weight products. Whether the product mixture is purified, and how it is purified, will of course affect the composition of the product and accordingly the length of vinyl polymer chains present. Thus, in some scenarios, where lower molecular weight products are removed, the average vinyl polymer chain length in the resultant purified product may be higher.

Optionally, the product may contain a large amount of trivinyl monomer residues wherein two of the double bond residues are capped with a chain transfer agent (as opposed to being part of a chain), i.e. have a nominal chain length of 1. The other double bond residues of those trivinyl monomer residues may be part of a longer chain. This may be the most common form of the vinyl residue in the product. Optionally the most common vinyl "chain" is that which contains only one trivinyl monomer residue. Optionally the two most common vinyl chains are (i) the vinyl "chain" which contains only one trivinyl monomer residue and (ii) a vinyl chain which contains an integer selected from between 2 and 7, e.g. between 2 and 6, e.g. between 2 and 5, e.g. between 3 and 7, e.g. between 3 and 6, e.g. between 3 and 5, e.g. 3 or 4, e.g. 3 or e.g. 4, trivinyl monomer residues. Optionally the most common vinyl "chain" is that which contains only one trivinyl monomer residue, and the second most common vinyl chain contains an integer selected from between 2 and 7, e.g. between 2 and 6, e.g. between 2 and 5, e.g. between 3 and 7, e.g. between 3 and 6, e.g. between 3 and 5, e.g. 3 or 4, e.g. 3 or e.g. 4, trivinyl monomer residues. Optionally the distribution of chain lengths may be bimodal, e.g. the maxima may be at chain length 1 and at a second chain length which may optionally be between 3 and 7, e.g. between 3 and 6, e.g. between 3 and 5, e.g. 3 or 4, e.g. 3 or e.g. 4.

Extent of Vinyl Polymerisation when Using Tetravinyl Monomers

The number of propagation steps (i.e. how many tetravinyl monomers are added) before each chain transfer (i.e. termination of the growing vinyl polymer chain) needs to be high enough to generate a branched polymer but low enough to prevent gelation. It appears that an average vinyl polymer chain length of between 1 and 1.7, between 1 and 1.5, between 1 and 1.4, between 1 and 1.33, between 1.1 and 1.33, between 1.2 and 1.33, between 1.25 and 1.33, or between 1.3 and 1.33, or of approximately 1.33, tetravinyl monomer residues, is suitable.

Whilst the average may optionally be between 1 and 1.7, a small number of vinyl polymer chains may contain significantly more tetravinyl monomer residues, for example as many as 3, 5, 10, 15, 18, 20 or more.

Optionally 90% of the vinyl polymer chains contain fewer than 6 tetravinyl monomer residues, or 90% have a length of 4 or fewer, or 90% have a length of 3 or fewer, or 90% have a length of 2 or fewer, or 95% have a length of 8 or fewer, or 95% have a length of 6 or fewer, or 95% have a length of 4 or fewer, or 95% have a length of 3 or fewer, or 75% have a length of 5 or fewer, or 75% have a length of 4 or fewer, or 75% have a length of 3 or fewer, or 75% have a length of 2 or fewer.

Without wishing to be bound by theory, the average vinyl polymer chain length, or kinetic chain length, in a scenario which assumes that there is no intramolecular reaction, can be calculated as follows. If, as discussed above there are $3n+1$ chain transfer agent moieties per n tetravinyl monomer moieties, and one chain transfer agent per vinyl polymer chain, then, because there are $4n$ double bonds per n tetravinyl monomers, the number of double bond residues per chain will on average be $4n/(3n+1)$ which will tend towards 1.33 as the molecular weight increases.

Therefore, according to this theoretical assessment, some examples of average vinyl chain length are as follows:

| Number of tetravinyl monomers in the polymer (n) | Average number of tetravinyl monomer residues per vinyl polymer chain $[4n/(3n + 1)]$ |
| --- | --- |
| 1 | $(4 \times 1)/(3 + 1) = 1$ |
| 2 | $(4 \times 2)/(6 + 1) = 1.14$ |
| 3 | $(4 \times 3)/(9 + 1) = 1.20$ |
| 5 | $(4 \times 5)/(15 + 1) = 1.25$ |
| 10 | $(4 \times 10)/(30 + 1) = 1.29$ |
| 20 | $(4 \times 20)/(60 + 1) = 1.31$ |
| 50 | $(4 \times 50)/(150 + 1) = 1.32$ |
| 100 | $(4 \times 100)/(300 + 1) = 1.33$ |

It can be seen that the range, for the average kinetic chain length under certain theoretical conditions, is between 1 and 1.33. In practice the value may fall outside this range: other reactions, for example intramolecular polymerisation, may occur.

The skilled person will understand that the process makes a range of products which, depending on the conditions, can include low molecular weight products (the smallest being the product containing just one tetravinyl monomer residue i.e. wherein the vinyl chain length is 1) up to high molecular weight products. Whether the product mixture is purified, and how it is purified, will of course affect the composition of the product and accordingly the length of vinyl polymer chains present. Thus, in some scenarios, where lower molecular weight products are removed, the average vinyl polymer chain length in the resultant purified product may be higher.

Optionally, the product may contain a large amount of tetravinyl monomer residues wherein three of the double bond residues are capped with a chain transfer agent (as opposed to being part of a chain), i.e. have a nominal chain length of 1. The other double bond residues of those tetravinyl monomer residues may be part of a longer chain. This may be the most common form of the vinyl residue in the product. Optionally the most common vinyl "chain" is that which contains only one tetravinyl monomer residue. Optionally the two most common vinyl chains are (i) the vinyl "chain" which contains only one tetravinyl monomer residue and (ii) a vinyl chain which contains an integer selected from between 2 and 6, e.g. between 2 and 5, e.g. between 2 and 4, e.g. between 3 and 6, e.g. between 3 and 5, e.g. 3 or 4, e.g. 3 or e.g. 4, tetravinyl monomer residues. Optionally the most common vinyl "chain" is that which contains only one tetravinyl monomer residue, and the second most common vinyl chain contains an integer selected from between 2 and 6, e.g. between 2 and 5, e.g. between 2 and 4, e.g. between 3 and 6, e.g. between 3 and 5, e.g. 3 or 4, e.g. 3 or e.g. 4, tetravinyl monomer residues. Optionally the distribution of chain lengths may be bimodal, e.g. the maxima may be at chain length 1 and at a second chain length which may optionally be between 3 and 6, e.g. between 3 and 5, e.g. 3 or 4, e.g. 3 or e.g. 4.

Extent of Vinyl Polymerisation when Using Multivinyl Monomers in General

Numerical relationships and theoretical assessments have been presented above for each of divinyl monomers, trivinyl monomers and tetravinyl monomers.

In summary, without wishing to be bound by theory, in certain idealised scenarios the average number of multivinyl monomer residues per vinyl polymer chain may be as follows, where the product contains n multivinyl monomer residues:

| | Average number of multivinyl monomer residues per vinyl polymer chain in final product | as n tends to infinity, the average number of MVM residues per vinyl polymer chain tends towards |
| --- | --- | --- |
| Divinyl monomer | $2n/(n + 1)$ | 2 |
| Trivinyl monomer | $3n/(2n + 1)$ | 1.5 |
| Tetravinyl monomer | $4n/(3n + 1)$ | 1.33 |

Thus it can be seen that, as the valency of the monomers increases, the average vinyl chain length is required to decrease.

In general the following may optionally apply across the various types of multivinyl monomers discussed herein.

The average vinyl polymer chain length may contain the following number of multivinyl monomer residues: between 1 and 3, between 1 and 2.5, between 1 and 2.2, between 1 and 2, between 1.1 and 2, between 1.2 and 2, between 1.3 and 2, between 1.33 and 2, between 1.5 and 2, between 1.8 and 2, between 1.9 and 2, between 1.95 and 2, between 1.2 and 1.5, between 1.3 and 1.5, between 1.4 and 1.5, between 1.45 and 1.5, between 1.1 and 1.4, between 1.2 and 1.4, between 1.2 and 1.33, or between 1.3 and 1.33.

Whilst the average may optionally be between 1 and 3, a small number of vinyl polymer chains may contain significantly more multivinyl monomer residues, for example as many as 3, 5, 8, 10, 15, 18, 20 or more.

Optionally 90% of the vinyl polymer chains contain fewer than 10 multivinyl monomer residues, or 90% have a length of 7 or fewer, or 90% have a length of 5 or fewer, or 90% have a length of 4 or fewer, or 90% have a length of 3 or fewer, or 90% have a length of 2 or fewer, or 95% have a length of 15 or fewer, or 95% have a length of 10 or fewer, or 95% have a length of 7 or fewer, or 95% have a length of 5 or fewer, or 95% have a length of 4 or fewer, or 95% have a length of 3 or fewer, or 75% have a length of 10 or fewer, or 75% have a length of 7 or fewer, or 75% have a length of 5 or fewer, or 75% have a length of 4 or fewer, or 75% have a length of 3 or fewer, or 75% have a length of 2 or fewer.

Optionally, the product may contain a large amount of multivinyl monomer residues wherein all but one of the double bond residues in the multivinyl monomer residue is capped with a chain transfer agent (as opposed to being part of a chain), i.e. has a nominal chain length of 1. The remaining double bond residue of the multivinyl monomer residues may be part of a longer chain. This may be the most common form of the vinyl residue in the product. Optionally the most common vinyl "chain" is that which contains only one multivinyl monomer residue. Optionally the two most common vinyl chains are (i) the vinyl "chain" which contains only one multivinyl monomer residue and (ii) a vinyl chain which contains an integer selected from between 2 and 8, e.g. between 2 and 7, e.g. between 2 and 6, e.g. between 2 and 5, e.g. between 3 and 8, e.g. between 3 and 7, e.g. between 3 and 6, e.g. between 3 and 5, e.g. 3, e.g. 4 or e.g. 5 multivinyl monomer residues. Optionally the most common vinyl "chain" is that which contains only one multivinyl monomer residue, and the second most common vinyl chain contains an integer selected from between 2 and 8, e.g. between 2 and 7, e.g. between 2 and 6, e.g. between 2 and 5, e.g. between 3 and 8, e.g. between 3 and 7, e.g. between 3 and 6, e.g. between 3 and 5, e.g. 3, e.g. 4 or e.g. 5, multivinyl monomer residues. Optionally the distribution of chain lengths may be bimodal, e.g. the maxima may be at chain length 1 and at a second chain length which may optionally be between 3 and 8, e.g. between 3 and 7, e.g. between 3 and 6, e.g. between 3 and 5, e.g. 3, 4 or 5.

Source of Radicals

The source of radicals may be an initiator such as azoisobutyronitrile (AIBN). Optionally the amount used relative to divinyl monomer may be 0.001 to 1, 0.01 to 0.1, 0.01 to 0.05, 0.02 to 0.04 or approximately 0.03 equivalents. In view of the presence of two double bonds per monomer this equates to 0.0005 to 0.5, 0.005 to 0.05, 0.005 to 0.025, 0.01 to 0.02 or approximately 0.015 equivalents relative to double bond.

It has been found that the reactions proceed effectively when only small amounts of initiator are used. Reducing the amount of initiator means that the reactions may proceed more slowly but still at speeds which are industrially acceptable. Lower amounts of initiator are beneficial in terms of cost, residual effect in the product, and controlling the exotherm to enhance safety and facilitate manageable reactions even when scaled up.

Other possible sources of radicals include peroxides, organo-boranes, persulphates or UV-initiated systems.

Reaction Conditions

The reaction may be carried out under conventional industrial free radical polymerisation conditions. Optionally a solvent such as for example toluene may be used.

As the reaction conditions become more dilute (e.g. as shown in the Examples below where the solids content is reduced from 50 wt % to 10 wt %), the amount of CTA in the product can decrease. Without wishing to be bound by theory, this may be because at greater dilution intramolecular reaction is more likely, meaning that, effectively, reaction of the molecule with itself takes the place of reaction of the molecule with a CTA molecule. Accordingly, this can alter the numerical relationships discussed above, because these assume a theoretical situation in which there is no intramolecular reaction.

This provides a further way of controlling the chemistry and tailoring the type of product and its properties. For example, whereas in some scenarios it may be desirable to have a large amount of CTA residue in the product, in other scenarios it is desirable not to, for example to reduce the amount of thiol residues. Furthermore, carrying out the same reaction at different dilutions can lead to different physical properties such that for example some products are solids and others are liquids. Ways of manipulating the glass-transition temperature and/or melting temperature can be useful for various applications.

Conversion

In accordance with the present invention, polymerization may proceed to the extent that the polymer product contains very little, substantially no, or no, residual vinyl functionality. Optionally, no more than 20 mol %, no more than 10 mol %, no more than 5 mol %, no more than 2 mol %, or no more than 1 mol %, of the radically polymerizable double bonds of the multivinyl monomer, e.g. of the divinyl monomer, remain in the polymer. As shown below, NMR analysis has indicated that products of the present invention can be obtained with no measurable residual vinyl signals. This is clearly advantageous in controlling the chemistry and consequent properties of the product.

In contrast, some prior art using ATRP or RAFT methods discloses stopping polymerizations at lower conversion levels such that there may for example be more than 30% of the double bonds remaining. This is done in the prior art in order to prevent gelation.

By using a large amount of CTA, and/or controlling other aspects of the reaction, the present invention not only avoids gelation but also allows substantially complete conversion.

The method of the present invention is also advantageous in allowing complete reaction in a short space of time. We have observed that, on a laboratory scale, reaction is substantially complete after about 2.5 hours: after that point there is no significant increase in molecular weight distribution (as measured by size exclusion chromatography). Even on an industrial scale it is expected that the process would be completed within 8 hours i.e. within a single working shift. Under dilute conditions the process may take longer but still reach acceptable conversion after a reasonable period of time.

Whilst, from the first aspect above, reference has been made to preventing gelation, from other aspects it is instead possible to define the invention in terms of the other features described above, solely or in combination, e.g. the amount of chain transfer agent, extent of conversion, and/or amount of initiator. For example, the present invention provides a method of preparing a branched polymer comprising the free radical polymerisation of a divinyl monomer in the presence of a chain transfer agent, using a source of radicals, wherein 1 to 10 molar equivalents of chain transfer agent are used relative to divinyl monomer, and/or wherein the polymer product contains on average 0.9 to 1.1 chain transfer agent moieties per divinyl monomer moiety, and/or wherein the average vinyl polymer chain length is between 1.8 and 2 divinyl monomer residues, and/or wherein conversion of divinyl monomer to polymer is 80% or more, and/or wherein 0.001 to 1 molar equivalents of radical source are used relative to divinyl monomer. In other examples, the present invention provides a method of preparing a branched polymer comprising the free radical polymerisation of a multivinyl monomer in the presence of a chain transfer agent, using a source of radicals, wherein 1 to 6 molar equivalents of chain transfer agent are used relative to multivinyl monomer, and/or wherein the polymer product contains on average 1 to 3 chain transfer agent moieties per multivinyl monomer moiety, and/or wherein the average vinyl polymer chain length is between 1.33 and 2 multivinyl monomer residues, and/or wherein conversion of multivinyl monomer to polymer is 80% or more, and/or wherein 0.001 to 1 molar equivalents of radical source are used relative to multivinyl monomer.

Polymer Products

The present invention relates not only to a new method of polymerisation but to corresponding polymerisation products. The process imparts particular distinguishing characteristics (particularly in terms of architecture, branching and solubility).

Therefore, from a further aspect the present invention provides a polymer obtainable by the process of the present invention.

From a yet further aspect the present invention provides a polymer obtained by the process of the present invention.

Nevertheless it is also possible to define the polymers of the present invention in terms of their structure rather than in terms of the process used to make them.

Accordingly, from a further aspect the present invention provides a branched polymer product comprising divinyl monomer residues and chain transfer residues, wherein the molar ratio of chain transfer residues to divinyl monomer residues is between 0.5 and 2. The ratio is optionally between 0.7 and 1.5, optionally between 0.75 and 1.3, optionally between 0.8 and 1.2, optionally between 0.9 and 1.1, optionally between 1 and 1.05, optionally approximately 1.

Some of the vinyl polymer chains may contain as many as 18, or 15, divinyl monomer residues. Only a small proportion are this long, however: the average, for high molecular weight materials, may be around 2.

Optionally 90% of the vinyl polymer chains contain fewer than 10 DVM residues, or 90% have a length of 7 or fewer, or 90% have a length of 5 or fewer, or 95% have a length of 15 or fewer, or 95% have a length of 10 or fewer, or 95% have a length of 7 or fewer, or 75% have a length of 10 or fewer, or 75% have a length of 7 or fewer, or 75% have a length of 5 or fewer, or 75% have a length of 4 or fewer, or 75% have a length of 3 or fewer).

Thus the present invention provides a branched polymer product comprising divinyl monomer residues and chain transfer residues, wherein 90% of the vinyl polymer chains contain fewer than 10 DVM residues, or 90% have a length of 7 or fewer, or 90% have a length of 5 or fewer, or 95% have a length of 15 or fewer, or 95% have a length of 10 or fewer, or 95% have a length of 7 or fewer, or 75% have a length of 10 or fewer, or 75% have a length of 7 or fewer, or 75% have a length of 5 or fewer, or 75% have a length of 4 or fewer, or 75% have a length of 3 or fewer).

During the reaction, it is possible that neither of the two carbon atoms of a vinyl group forms a bond to another vinyl group (instead they could form a bond to a CTA residue or hydrogen, or, in some cases, other moiety such as initiator residue or solvent residue), or it is possible that one of the two carbon atoms of a vinyl group forms a bond to another vinyl group, or it is possible that both carbon atoms of a vinyl group form bonds to other vinyl groups. Therefore, in the product, each vinyl residue may be directly linked to 0, 1 or 2 other vinyl residues as closest neighbours. We have found that where the mean of this number is within particular ranges, then effective branched polymers are obtained. Therefore, from a further aspect the present invention provides a branched polymer product comprising divinyl monomer residues and chain transfer residues, wherein each vinyl residue is directly vinyl polymerised to on average 0.5 to 1.5 other divinyl monomer residue. Optionally this may be 0.8 to 1.2, 0.8 to 1.1, 0.9 to 1, or approximately 1, on average.

Thus the polymers of the present invention are characterised by having a large amount of chain transfer agent incorporation, and also by having short distinct vinyl polymer chains. Whereas, conventionally, a vinyl polymer chain will normally comprise a long saturated backbone, in the present invention—even though the polymers are built up using vinyl polymerisation—most of the double bonds only react with one other double bond, or react with no other double bonds, rather than react with two other double bonds. This means that the linkages between the two double bonds in the monomer, which linkages conventionally bring about branching between polymer chains in the prior art, instead form the backbone of the longest polymer chains in the present invention. This is conceptually different from the prior art and represents a step change in how branched polymerisation may be achieved.

As discussed above, a further way of defining the present invention is in terms of the limited length of vinyl chain segments within the polymer.

Therefore, from a further aspect the present invention provides a branched polymer product comprising divinyl monomer residues and chain transfer residues, wherein the branched polymer product comprises a multiplicity of vinyl polymer chain segments having an average length of between 1 and 3 divinyl monomer residues.

The average length may be between 1 and 2.5, between 1 and 2.2, between 1 and 2, between 1.3 and 2, between 1.5 and 2, between 1.7 and 2, between 1.8 and 2, between 1.9 and 2, between 1.95 and 2, or approximately 2.

The skilled person will understand how the number of double bond residues affects the carbon chain length of the resultant vinyl polymer segment. For example, where a polymer chain segment comprises 2 double bond residues, this equates to a saturated carbon chain segment of 4 carbon atoms.

The incorporation of monovinyl monomers as well as divinyl monomers may affect the average vinyl chain length but does not affect the average number of divinyl monomer residues per chain. It can be a way of increasing the vinyl chains without increasing branching.

The product can also be defined in terms of the amount of residual vinyl functionality.

Thus, from a further aspect the present invention provides a branched polymer product comprising divinyl monomer residues and chain transfer residues wherein the divinyl monomer residues comprise less than 20 mol % double bond functionality.

In other words, in such polymer products, at least 80% of the double bonds of the divinyl monomers have reacted to form saturated carbon-carbon chains.

The residues may comprise less than 10 mol %, or less than 5 mol %, or less than 2 mol %, or less than 1 mol %, or substantially no, double bond functionality.

Another way of defining the product is in terms of its Mark Houwink alpha value. Optionally, this may be below 0.5.

The above description of polymer products relates in particular to those containing divinyl monomer residues. Analogously, the present invention provides polymer products containing other multivinyl monomer residues including for example trivinyl monomer residues and tetravinyl monomer residues. Disclosures herein relating to the polymerisation methods are applicable also to the resultant products.

Thus, the present invention provides a branched polymer product comprising multivinyl monomer residues and chain transfer residues, wherein the molar ratio, on average, of chain transfer residues to multivinyl monomer residues may optionally be:

for multivinyl monomers generally:
between 0.5 and 6, between 0.7 and 4.5, between 0.75 and 3.9, between 0.8 and 3.6, between 0.9 and 3.3, between 1 and 3.15, or between approximately 1 and approximately 3;

for trivinyl monomers:
between 1 and 4, between 1.4 and 3, between 1.5 and 2.6, between 1.6 and 2.4, between 1.8 and 2.2, between 2 and 2.1, or approximately 2;

for tetravinyl monomers:
between 1.5 and 6, between 2.1 and 4.5, between 2.25 and 3.9, between 2.4 and 3.6, between 2.7 and 3.3, between 3 and 3.15, or approximately 3.

Furthermore the present invention provides a branched polymer product comprising multivinyl monomer residues and chain transfer residues, wherein optionally:

for multivinyl monomers generally:
90% of the vinyl polymer chains contain fewer than 10 multivinyl monomer residues, or 90% have a length of 7 or fewer, or 90% have a length of 5 or fewer, or 90% have a length of 4 or fewer, or 90% have a length of 3 or fewer, or 90% have a length of 2 or fewer, or 95% have a length of 15 or fewer, or 95% have a length of 10 or fewer, or 95% have a length of 7 or fewer, or 95% have a length of 5 or fewer, or 95% have a length of 4 or fewer, or 95% have a length of 3 or fewer, or 75% have a length of 10 or fewer, or 75% have a length of 7 or fewer, or 75% have a length of 5 or fewer, or 75% have a length of 4 or fewer, or 75% have a length of 3 or fewer, or 75% have a length of 2 or fewer;

for trivinyl monomers:
90% of the vinyl polymer chains contain fewer than 8 TVM residues, or 90% have a length of 5 or fewer, or 90% have a length of 4 or fewer, or 95% have a length of 10 or fewer, or 95% have a length of 8 or fewer, or 95% have a length of 5 or fewer, or 75% have a length of 8 or fewer, or 75% have a length of 6 or fewer, or 75% have a length of 4 or fewer, or 75% have a length of 3 or fewer, or 75% have a length of 2 or fewer;

for tetravinyl monomers:
90% of the vinyl polymer chains contain fewer than 6 tetravinyl monomer residues, or 90% have a length of 4 or fewer, or 90% have a length of 3 or fewer, or 90% have a length of 2 or fewer, or 95% have a length of 8 or fewer, or 95% have a length of 6 or fewer, or 95% have a length of 4 or fewer, or 95% have a length of 3 or fewer, or 75% have a length of 5 or fewer, or 75% have a length of 4 or fewer, or 75% have a length of 3 or fewer, or 75% have a length of 2 or fewer The present invention also provides a branched polymer product comprising multivinyl monomer residues and chain transfer residues, wherein optionally each vinyl bond is directly vinyl polymerised to on average:

for multivinyl monomers generally:
0.1 to 1.5, 0.2 to 1.2, 0.825 to 1.1, or approximately 0.3 to 1, other multivinyl monomer residue;

for trivinyl monomers:
0.2 to 1.3, 0.25 to 1.2, 0.3 to 1, 0.4 to 0.7, or approximately 0.5, other trivinyl monomer residue;

for tetravinyl monomers:
0.1 to 1, 0.2 to 0.8, 0.25 to 0.5, or approximately 0.3, other tetravinyl monomer residue.

Furthermore the present invention provides a branched polymer product comprising multivinyl monomer residues and chain transfer residues, wherein the branched polymer product comprises a multiplicity of vinyl polymer chain segments having an average length of:

for multivinyl monomers generally:
between 1 and 3, between 1 and 2.5, between 1 and 2.2, between 1 and 2, between 1.1 and 2, between 1.2 and 2, between 1.3 and 2, between 1.33 and 2, between 1.5 and 2, between 1.8 and 2, between 1.9 and 2, between 1.95 and 2, between 1.2 and 1.5, between 1.3 and 1.5, between 1.4 and 1.5, between 1.45 and 1.5, between 1.1 and 1.4, between 1.2 and 1.4, between 1.2 and 1.33, or between 1.3 and 1.33 multivinyl monomer residues;

for trivinyl monomers:
between 1 and 2, between 1 and 1.8, between 1 and 1.7, between 1 and 1.5, between 1.1 and 1.5, between 1.2 and 1.5, between 1.25 and 1.5, between 1.3 and 1.5, between 1.4 and 1.5, or between 1.45 and 1.5, or of approximately 1.5, trivinyl monomer residues;

for tetravinyl monomers:
between 1 and 1.7, between 1 and 1.5, between 1 and 1.4, between 1 and 1.33, between 1.1 and 1.33, between 1.2 and 1.33, between 1.25 and 1.33, or between 1.3 and 1.33, or of approximately 1.33, tetravinyl monomer residues.

The incorporation of monovinyl monomers as well as multivinyl monomers may affect the average vinyl chain length but does not affect the average number of multivinyl monomer residues per chain. It can be a way of increasing the vinyl chains without increasing branching.

From a further aspect the present invention provides a branched polymer product comprising multivinyl monomer residues and chain transfer residues wherein the multivinyl monomer residues comprise less than 20 mol % double bond functionality. The residues may comprise less than 10 mol %, or less than 5 mol %, or less than 2 mol %, or less than 1 mol %, or substantially no, double bond functionality.

Examples

Figure 2:
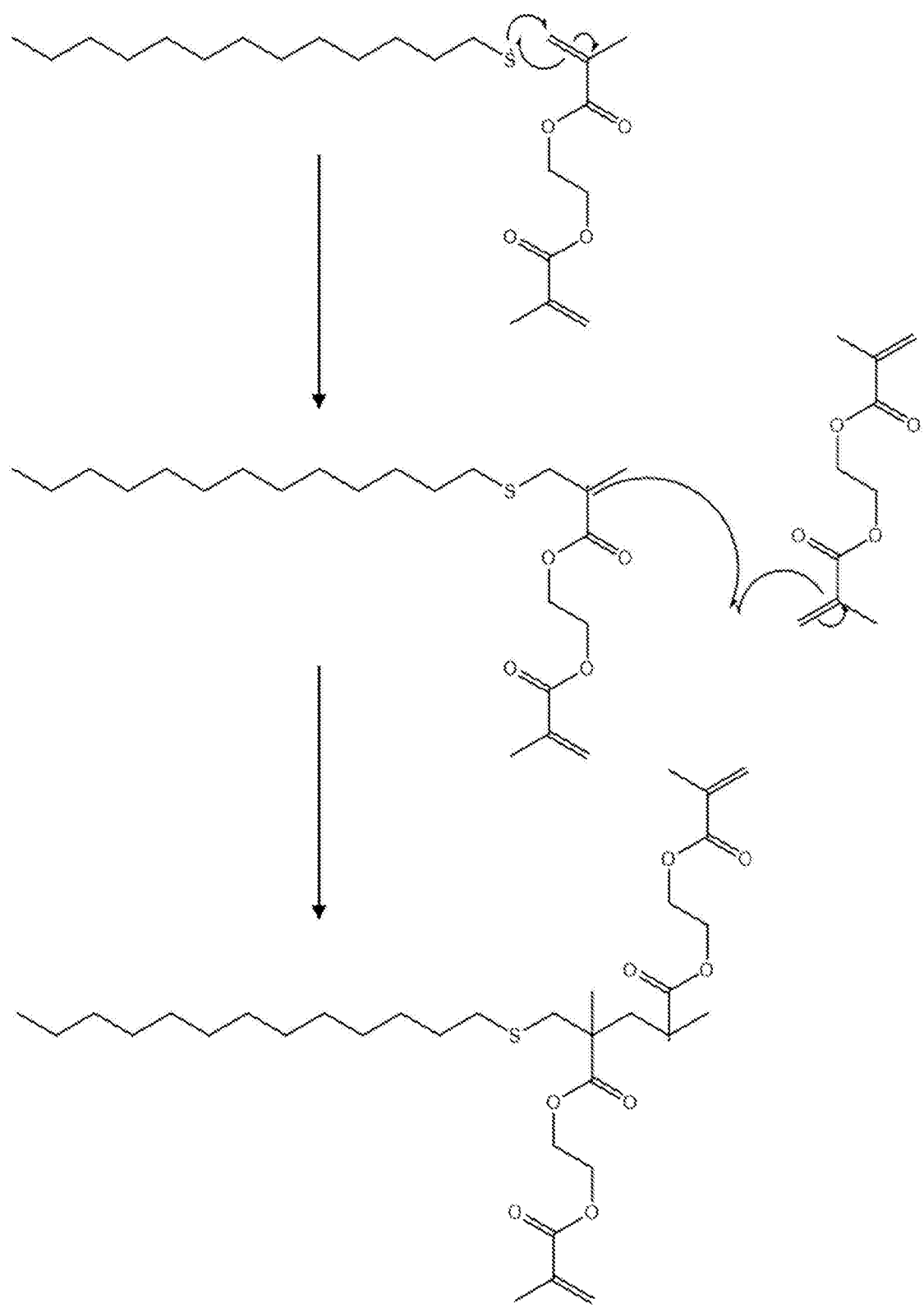

With reference to FIG. 1, radical activity is transferred to a chain transfer agent such as dodecanethiol, by reaction with a radical derived from an initiator such as AIBN, or by reaction with a radical derived from a divinyl monomer (e.g. from EGDMA) which has previously reacted with a source of radicals. This results in a chain transfer agent radical [$CH_3(CH_2)_{11}S\cdot$ in FIG. 1] which (FIG. 2) reacts with divinyl monomer in the present invention and results in propagation of the chain.

Figure 3:
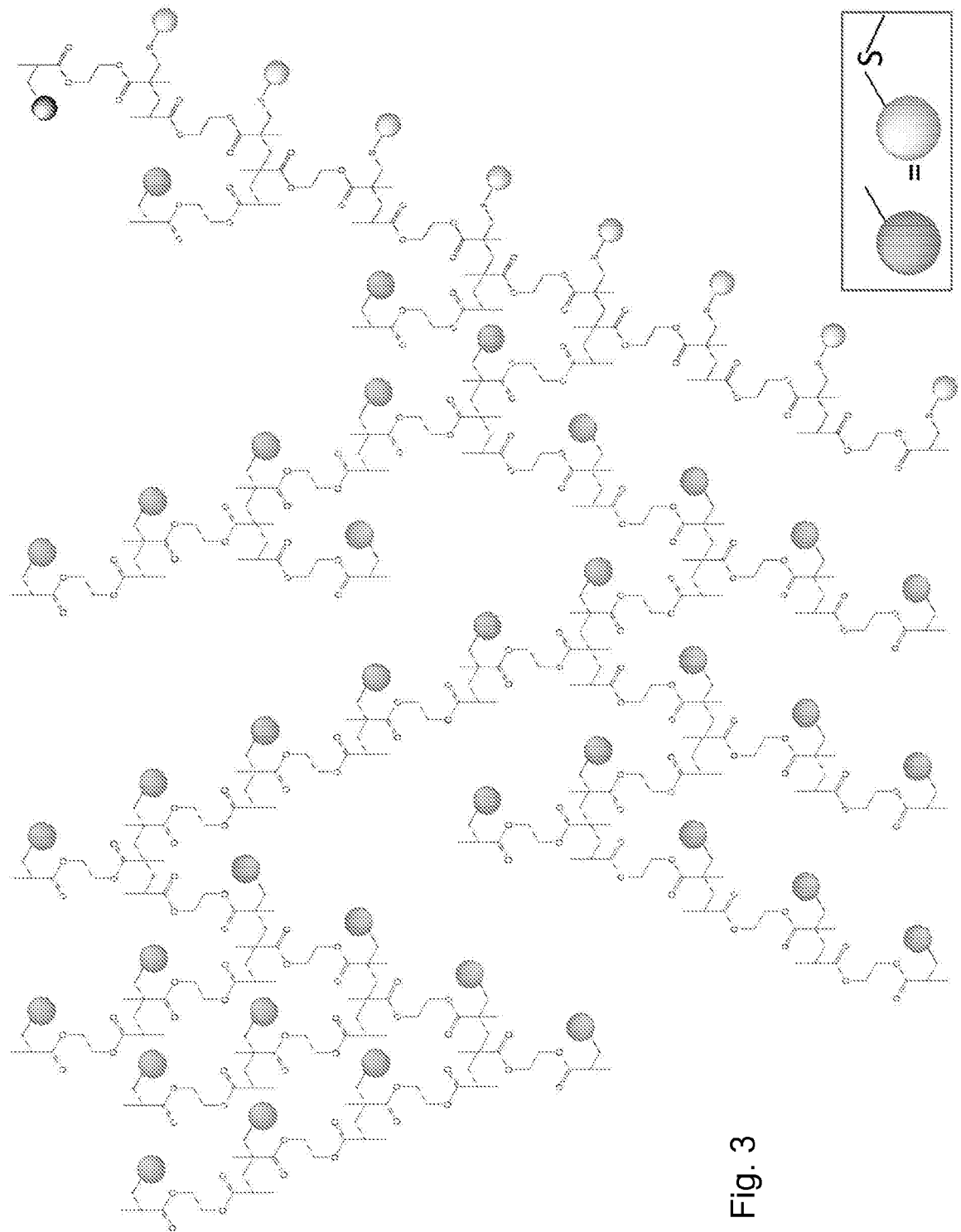
FIGS. 3 and 4 show schematic representations of a branched polymer in accordance with one embodiment of the present invention.
Figure 4:
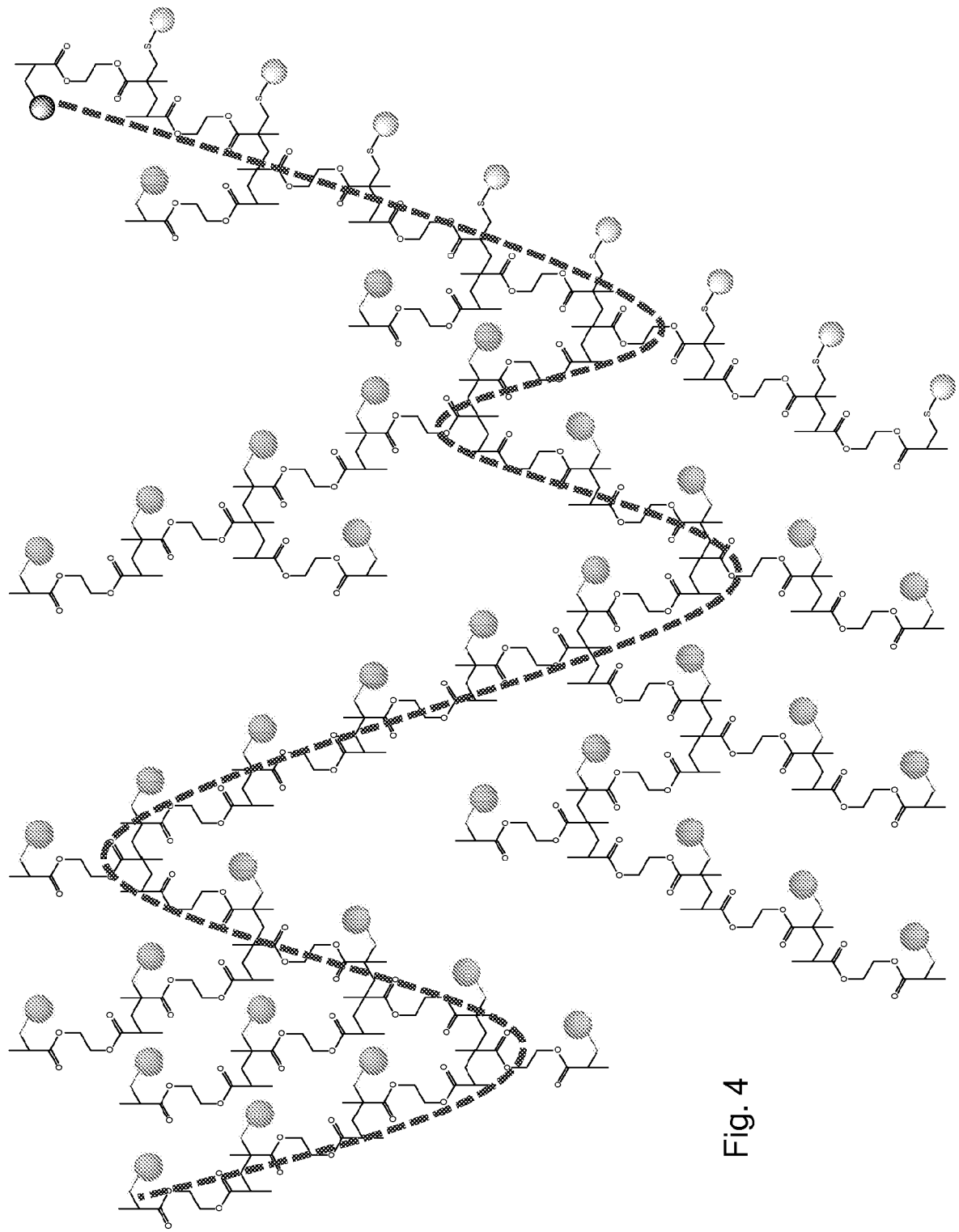

A schematic representation of the resultant branched polymer is shown in FIGS. 3 and 4. Where DDT is used as the chain transfer agent the circle represents a moiety which comprises a dodecyl chain. Although the polymer is built up by vinyl polymerisation, nevertheless the chemistry of the longest chains in the product is determined by the other functional groups present in the divinyl monomer, and accordingly in some embodiments the longest chains may be polyesters.

Figure 5:
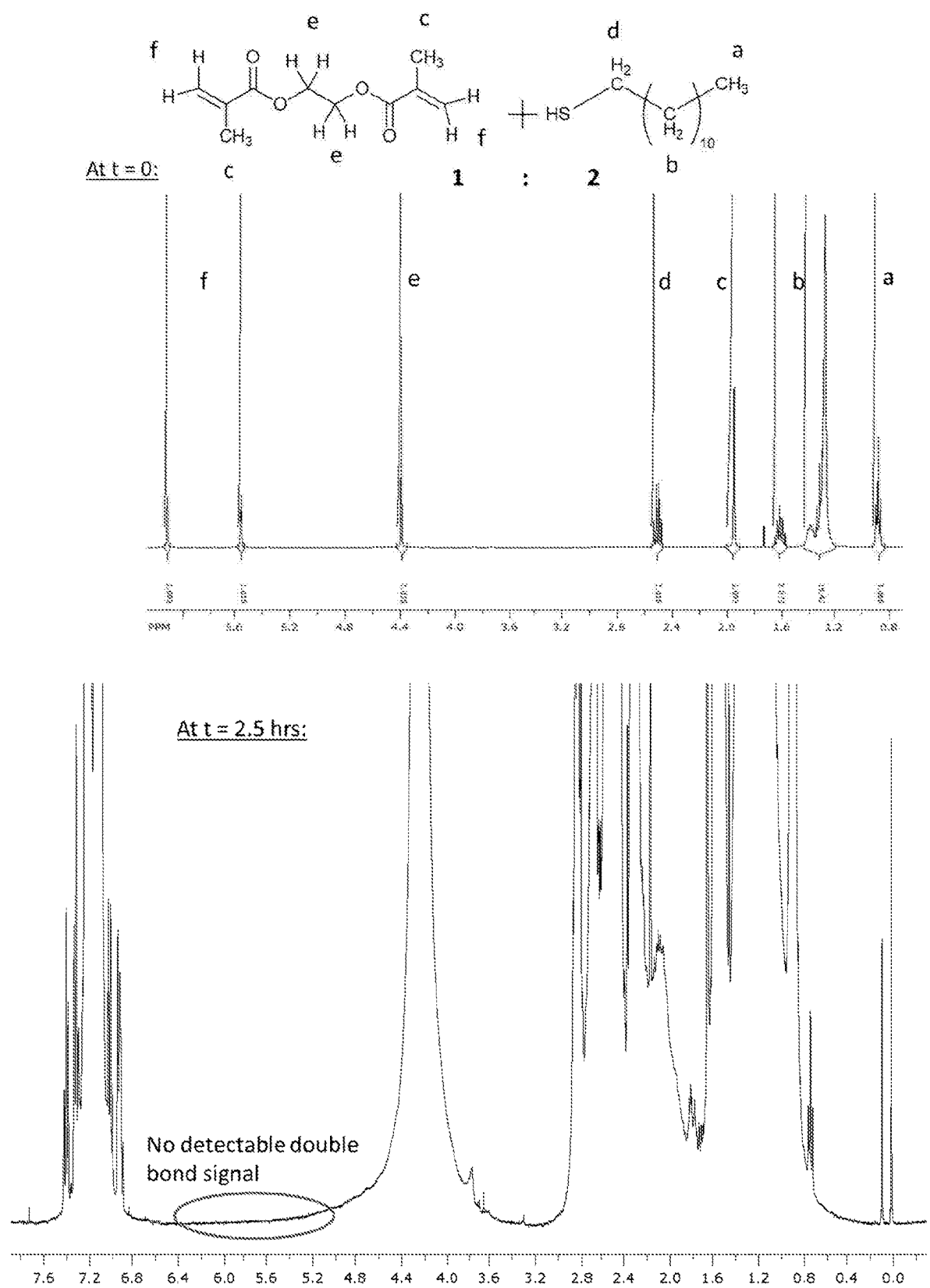
FIG. 5 shows NMR spectra at different stages during the polymerization process in accordance with one embodiment of the present invention.
Figure 6:
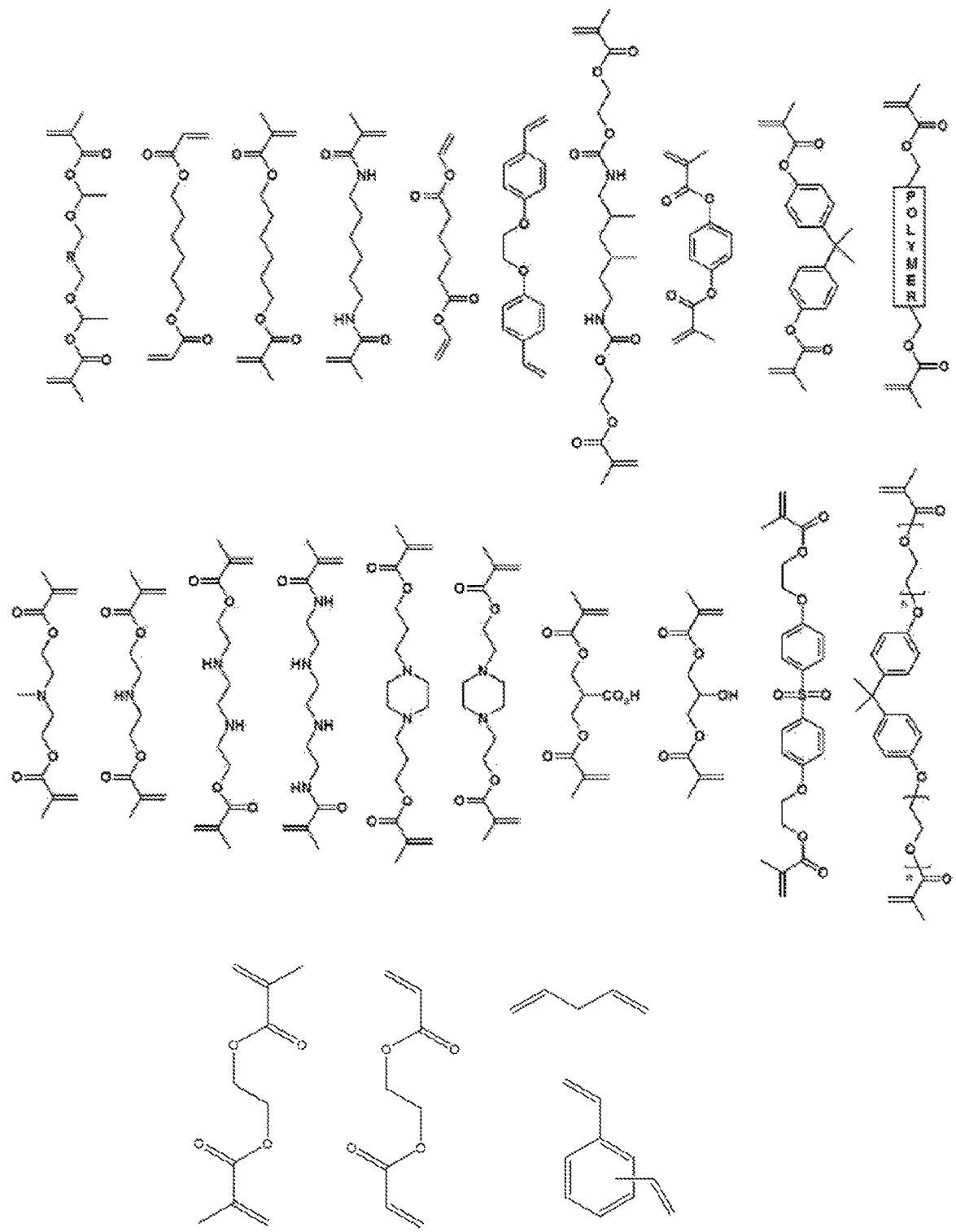
FIG. 6 shows examples of some compounds which may be used as divinyl monomers in the present invention.
Figure 7:
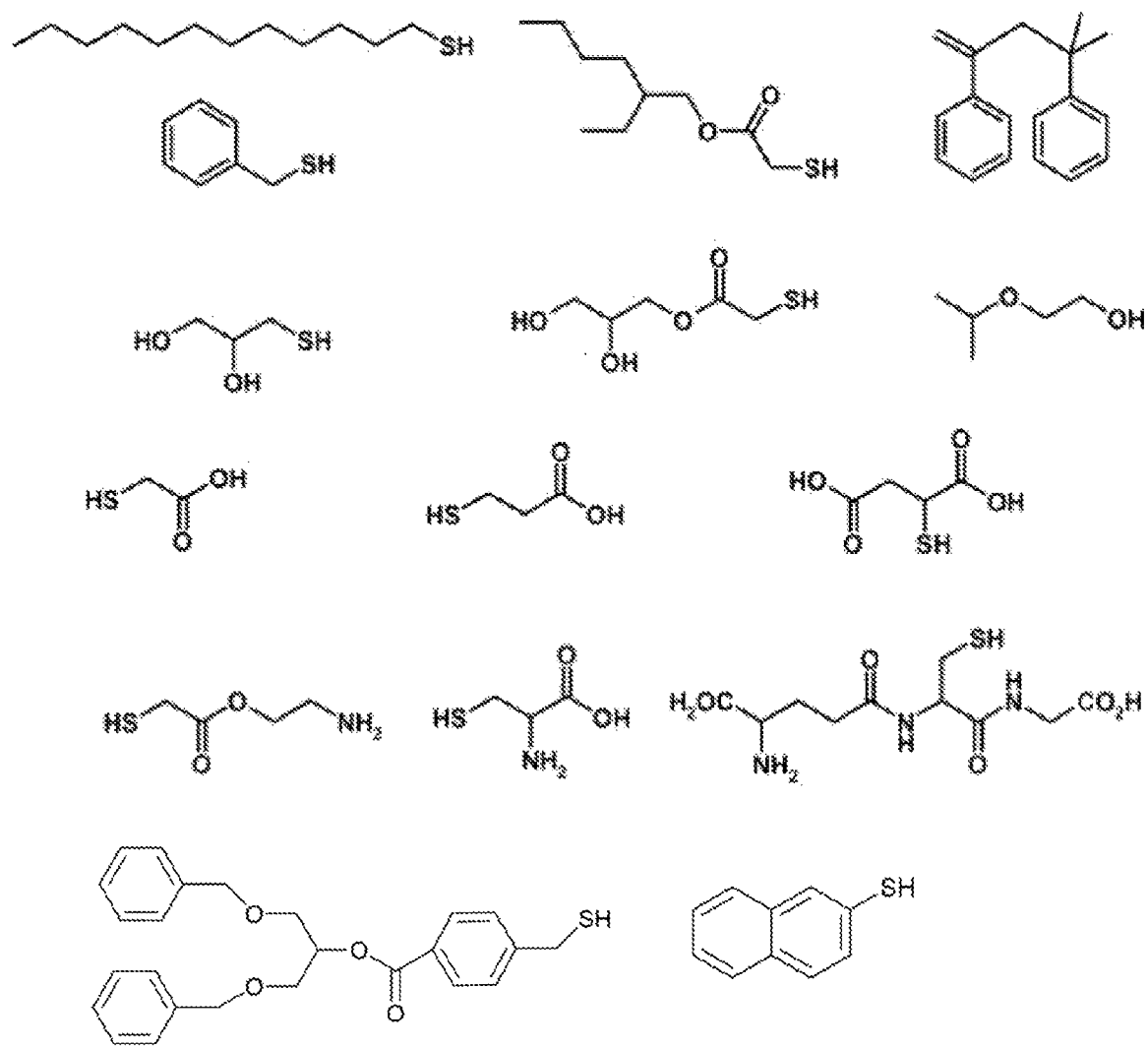
FIG. 7 shows examples of some compounds which may be used as chain transfer agents in the present invention.

One advantage of the present invention is that the vinyl functionality of the monomers can react completely. Experimental proof of this has been obtained by NMR analysis: in FIG. 5, the top NMR spectrum, in respect of a sample at the start of the reaction, shoes $^1H$ NMR due to the presence of double bond hydrogens. After reaction, the NMR trace (bottom) shows no detectable double bond signals.

Figure 8:
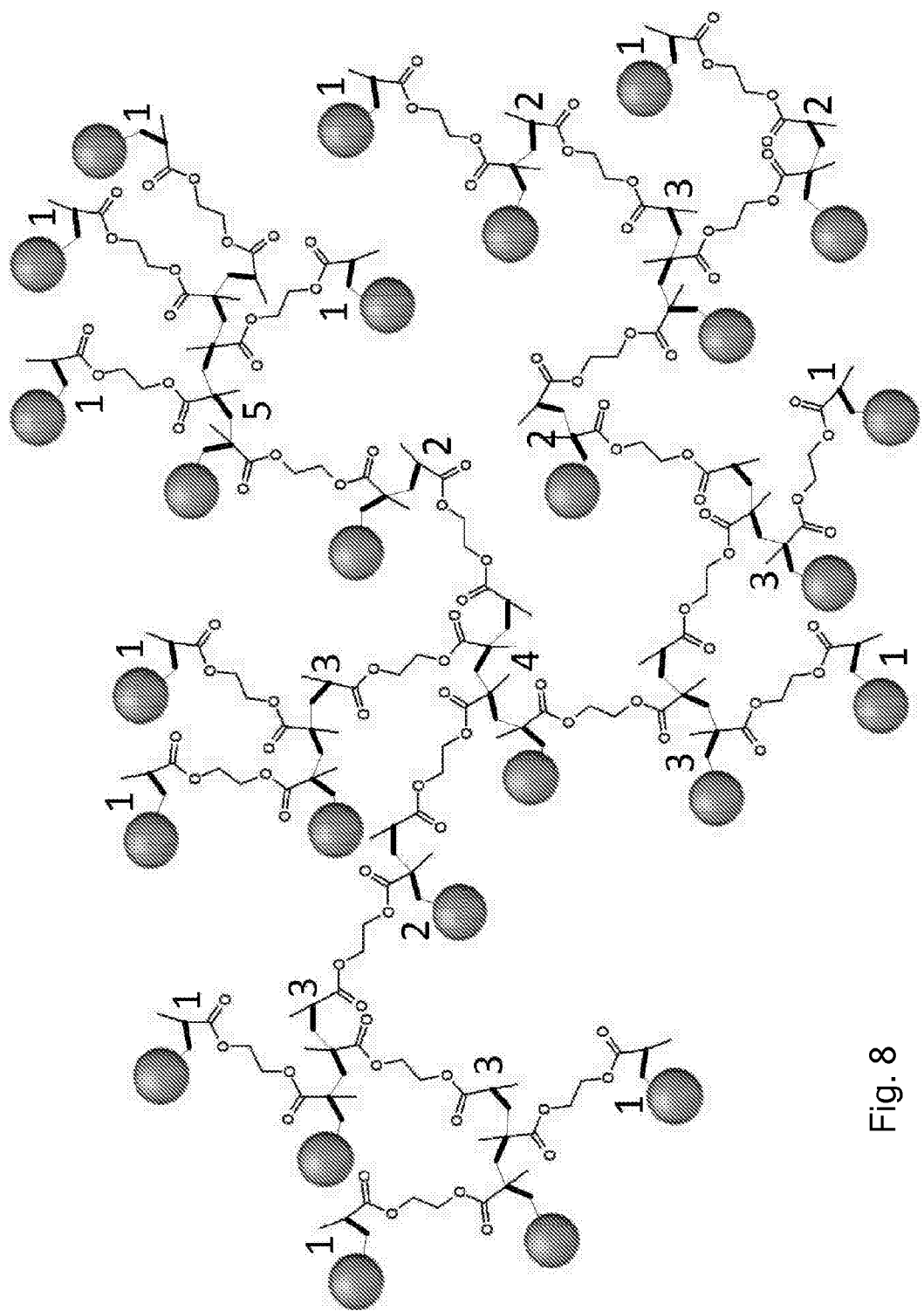
FIG. 8 shows a further schematic representation of a branched polymer in accordance with the present invention, highlighting the vinyl polymer chain lengths within the product.

FIG. 8 shows a branched polymer made from the divinyl monomer EGDMA and chain transfer agent DDT (shown as spheres). Thick lines indicate the C—C bonds which were double bonds in the monomer. The numerals indicate the vinyl polymer chain lengths. It can be seen that there are 13 chains of length 1, five chains of length 2, six chains of length 3, one chain of length 4 and one chain of length 5.

The product shown in FIG. 8 is consistent with the discussion above which refers to some standard systems having (n+1) chain transfer agent residues per n divinyl monomer residues, and average vinyl polymer chain lengths of 2n/(n+1). The ratio of chain transfer residues to divinyl monomer residues is 26:25 i.e. (n+1): n, such that the number of chain transfer residues per divinyl monomer residue is 26/25=1.04. The average polymer chain length is [(1×13)+ (2×5)+ (3×6)+ (4×1)+ (5×1)]/(13+5+6+1+1)=50/26=1.923 i.e. 2n/(n+1). All vinyl groups have reacted, i.e. the conversion is 100%. Each vinyl residue is directly vinyl polymerised to on average 48/50=0.96 other divinyl monomer residues.

Example 1—EGDMA as Divinyl Monomer and DDT as Chain Transfer Agent

Thus, in one embodiment, the divinyl monomer is EGDMA, the chain transfer agent is DDT, and a small amount of AIBN is used to provide a source of radicals. The reaction may be carried out in toluene, or other solvents.

Different ratios of chain transfer agent to divinyl monomer were investigated. A summary of the results is shown in the following table.

EGDMA—Monomer
DDT—CTA
AIBN—Thermal initiator
Toluene—Solvent (wt. 50%)
Standard Conditions:
 Oil bath at 70° C.
 Reaction time—24 hrs
 Mass of AIBN was based on 1.5% mol of double bonds in monomer

| EGDMA (mol eq.) | DDT (mol eq.) | Gel formation | EGDMA:DDT in final polymer product[a] | Vinyl conversion[a] | Mw (kg/mol)[b] | Mn (kg/mol)[b] | Đ | a[d] | Number of "repeat units" per object based on Mw |
|---|---|---|---|---|---|---|---|---|---|
| 1 | 0.5 | Yes | — | — | — | — | — | — | — |
| 1 | 1 | Yes | — | — | — | — | — | — | — |
| 1 | 2 | No | 1:1 | >99% | 26.6 | 8.8 | 3.02 | 0.28 | 66 |
| 1 | 2 | No | 1:1 | >99% | 19.4 | 5.35 | 3.6 | 0.234 | 48 |
| 1 | 1.33 | No | 1:0.95 | >99% | 144.0 | 12.7 | 11.4 | 0.3 | 360 |
| 1[c] | 1.33[c] | No[c] | 1:1.05[c] | >99%[c] | 157.4 | 4.4 | 35.6 | 0.287 | 393 |
| 1[e] | 1.33[e] | No[e] | 1:1[e] | >99% | 228.55[e] | 2.83[e] | 80.84[e] | 0.339[e] | 570[e] |
| 1 | 1.25 | No | 1:1 | >99% | 216.86 | 10.19 | 21.27 | 0.299 | 541 |
| 1 | 1.11 | No | 1:1.05 | >99% | 3,484.0 | 52.96 | 65.79 | 0.368 | 8,700 |

[a] determined by $^1$H NMR (400 MHz) in CDCl$_3$.
[b] determined by triple detection GPC
[c] scale-up reaction (3 time the previous scale)
[d] Mark-Houwink parameter: $[\eta] = KM^a$
[e] Reaction carried out in ethyl acetate at 50 wt % solid content From these results it can be seen that, for these reagents, gelation can be avoided by the use of more equivalents of the chain transfer agent DDT than the brancher EGDMA, and that the final product contains about the same amount of chain transfer agent as brancher. It can also be seen that changing the amount of chain transfer agent can affect the degree of polymerisation. For example, if just enough chain transfer agent is used to avoid gelation, a high molecular weight product can be obtained. The skilled person is able to tailor the product accordingly.

Experimental (for Approximately a 5 g Scale Reaction):

In a typical experiment, 55.9 mg of AIBN (0.3406 mmol, 1.5% vs. double bonds) were placed in a single neck 25 mL round bottomed flask. EGDMA (2.14 mL, 11.352 mmol, 0.75 eq), DDT (3.62 mL, 15.13 mmol, 1 eq) and Toluene (6.14 mL, 50 wt % vs. EGDMA and DDT) were added to the reactor and the mixture was purged by argon sparge for 15 minutes under stirring. The reactor was then placed in a preheated oil-bath at 70° C. for up to 24 hours. The resulting crude material was analysed by $^1$H NMR and showed no evidence of remaining double bonds after 2.5 hours. Further purification of the product was performed by evaporating the toluene on a rotary evaporator, dissolving the resulting mixture in THF and precipitating in methanol at room temperature (THF:methanol=1:10 v/v). The resulting white precipitate was isolated and dried under vacuum at 40° C. (yield ~85%).

Example 2—EGDMA as Divinyl Monomer and Benzyl Mercaptan as Chain Transfer Agent

| EGDMA (mol %) | Benzyl Mercaptan (mol %) | Gel formation | EGDMA:benzyl mercaptan in final polymer product[a] | Vinyl Conversion[a] | Mw (kg/mol)[b] | Mn (kg/mol)[b] | Đ | a[d] |
|---|---|---|---|---|---|---|---|---|
| 1 | 1 | Yes | — | — | — | — | — | — |
| 1 | 0.5 | Yes | — | — | — | — | — | — |
| 1[c] | 2[c] | No[c] | 1:1.1[c] | 100%[c] | 16.9[c] | 3.1[c] | 5.5[c] | 0.288[c] |
| 1 | 1.33 | Yes | — | — | — | — | — | — |
| 1 | 2 | No | 1:1.02 | 100% | — | — | — | — |

Details as Example 1, except:
[c] Reacted for 72 hours

Purification by precipitation was carried out using THF and ethanol at 0° C. to produce a white precipitate.

Example 3—EGDMA as Divinyl Monomer and 2-Naphthalenethiol as Chain Transfer Agent

| EGDMA (mol %) | 2-Naphthalenethiol (mol %) | Gel formation | Reaction Time (hrs) | Vinyl conversion | EGDMA: 2-naphthalenethiol in final polymer product |
|---|---|---|---|---|---|
| 2 | 1 | Yes | 1 | — | — |
| 1 | 1 | No | 24 | Unable to determine[a] | Unable to determine[a] |
| 1 | 1 | No | 48 | Unable to determine[a] | Unable to determine[a] |

Details as Example 1 except:
[a] Unable to analyse as it seems to be immiscible in chosen solvents: CDCl$_3$, toluene and CDCl$_3$, DMF and THF.

Example 4—EGDMA as Divinyl Monomer and a Dendron Thiol as Chain Transfer Agent

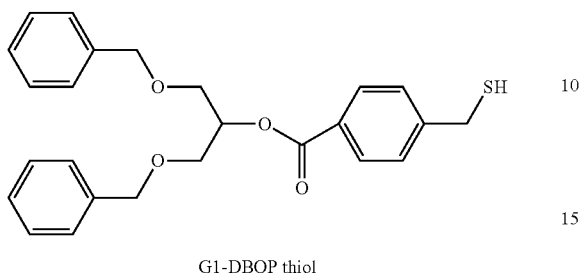

G1-DBOP thiol

| EGDMA (mol %) | G1-DBOP Thiol (mol %) | Gel formation | EGDMA:DBOP in final polymer product$^a$ | Vinyl conversion$^a$ | Mw (kg/mol)$^b$ | Mn (kg/mol)$^b$ | Ð | $α^d$ |
|---|---|---|---|---|---|---|---|---|
| 1 | 2.5 | No | 1:1 | 86% | 6.7 | 3.1 | 2.15 | 0.168 |

Details as Example 1.

Example 5—PEGDMA (Approximately 875 g Mol-1) as Monomer

| PEG-dimethacrylate (mol %) | DDT (mol %) | Gel formation | PEGDMA:DDT in final polymer product$^a$ | Vinyl conversion$^a$ | Mw (kg/mol)$^b$ | Mn (kg/mol)$^b$ | Ð | $a^c$ | No. of repeat units per object based on Mw |
|---|---|---|---|---|---|---|---|---|---|
| 1 | 2 | Yes | — | — | — | — | — | — | — |
| 1 | 1.33 | Yes | — | — | — | — | — | — | — |
| 1 | 4 | No | 1:1.2 | >99% | 22.6 | 6.4 | 3.55 | — | 21 |
| 1 | 4 | No | 1:1.1 | >99% | — | — | — | — | — |
| 1 | 3.33 | No | 1:1.1 | >99% | — | — | — | — | — |
| 1 | 2.89 | No | 1:1.1 | >99% | 54.7 | 4.7 | 11.6 | — | 51 |
| 1 | 2.5 | No | 1:1.1 | >99% | 2,200 | 61 | 36.5 | — | 2037 |

$M_{R.U.}$≈1080 g/mol
Details as Example 1 except:
$^c$Mark-Houwink parameter: [η] = KM$^a$

Example 6—PEGDMA (Approximately 3350 g Mol-1) as Divinyl Monomer and DDT as Chain Transfer Agent

| PEG-dimethacrylate (mol %) | DDT (mol %) | Gel formation | PEGDMA:DDT in final polymer product$^a$ | Vinyl conversion$^a$ | Mw (kg/mol)$^b$ | Mn (kg/mol)$^b$ | Ð | $a^c$ | No. of repeat units per object based on Mw |
|---|---|---|---|---|---|---|---|---|---|
| 1 | 1 | Yes | — | — | — | — | — | — | — |
| 1 | 4 | No | 1:1.3 | 100% | 93.6 | 8.8 | 10.6 | — | 26 |
| 1 | 2.5 | No | 1:1.3 | >99% | 103.8 | 7.7 | 13.4 | — | 29 |
| 1 | 2 | No | 1:1.1 | 100% | 106.7 | 9.5 | 11.2 | — | 30 |

Details as Example 5 except:
$M_{R.U.}$≈3350 g/mol

Examples 7 and 8—Polymerisations of EGDMA with DDT, or PEGDMA (Mw 875) with DDT, at a Higher Temperature

| EGDMA (mol %) | DDT (mol %) | Gel formation | EGDMA:DDT in final polymer product[a] | Vinyl conversion[a] | Mw (kg/mol)[b] | Mn (kg/mol)[b] | Đ | a[d] |
|---|---|---|---|---|---|---|---|---|
| 1 | 1 | Yes | — | — | — | — | — | — |
| 1 | 1.33 | No | 1:1 | >99% | — | — | — | — |

| PEG-dimethacrylate (mol %) | DDT (mol %) | Gel formation | PEGDMA:DDT in final polymer product[a] | Vinyl conversion[a] | Mw (kg/mol)[b] | Mn (kg/mol)[b] | Đ | a[d] |
|---|---|---|---|---|---|---|---|---|
| 1 | 2 | Yes | — | — | — | — | — | — |
| 1 | 2.5 | No | 1:1.1 | >99% | 1,600 | 28.9 | 55.3 | — |

Details as Examples 1 and 5 except:
Oil bath at 85° C. rather than 70° C.

Example 9: Divinyl Benzene as Divinyl Monomer and DDT as Chain Transfer Agent

Experimental:

In a typical experiment, 75.7 mg of AIBN (0.4608 mmol, 1.5% vs. double bonds) were placed in a single neck 25 mL round bottomed flask. DVB (2.19 mL, 15.36 mmol, 1 eq), DDT (3.68 mL, 15.36 mmol, 1 eq) and Toluene (5.91 mL, 50 wt % vs. DVB and DDT) were added to the reactor and the mixture was purged by argon sparge for 15 minutes under stirring. The reactor was then placed in a preheated oil-bath at 70° C. for up to 24 hours.

Further purification of the product was performed by evaporating the toluene on a rotary evaporator, dissolving the resulting mixture in THF and precipitating in methanol at room temperature (THF:methanol=1:10 v:v).

| DVB (eq.) | DDT (eq.) | Solid content | Gel Formation | DVB:CTA in final polymer product[a] | Vinyl conversion[a] | Mw (kg/mol)[b] | Mn (kg/mol)[b] | Đ[b] | α[c] |
|---|---|---|---|---|---|---|---|---|---|
| 1 | 1 | 50 wt % | No | 0.92:1.0 | 99% | 69.8 | 1.5 | 45.2 | 0.263 |
| 1 | 2 | 50 wt % | No | 0.57:1.0 | >99% | 1.02 | 0.8 | 1.24 | 0.643 |
| 1 | 1 | 70 wt % | Yes | — | — | — | — | — | — |
| 1 | 1 | 60 wt % | Yes | — | — | — | — | — | — |
| 1 | 1 | 55 wt % | No | 0.86:1 | 99% | 113.4 | 2 | 56.7 | 0.26 |

[a]determined by $^1$H NMR (400 MHz) in CDCl$_3$.
[b]determined by triple detection GPC
[c]Mark-Houwink parameter: $[\eta] = KM^a$ Example 10: Divinylbenzene as Divinyl Monomer and Benzyl Mercaptan as Chain Transfer Agent Experimental:

In a typical experiment, 18.9 mg of AIBN (0.1152 mmol, 1.5% vs. double bonds) were placed in a single neck 25 mL round bottomed flask. DVB (1.094 mL, 7.68 mmol, 0.5 eq), benzyl mercaptan (1.803 mL, 15.36 mmol, 1 eq) and Toluene (3.364 mL, 50 wt % vs. DVB and benzyl mercaptan) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in THF and precipitating in methanol at room temperature (THF:methanol=1:10 v:v).

| DVB (eq.) | Benzyl mercaptan (eq.) | Gel Formation | DVB:CTA in final polymer product[a] | Vinyl conversion[a] | Mw (kg/mol)[b] | Mn (kg/mol)[b] | Đ[b] | α[c] |
|---|---|---|---|---|---|---|---|---|
| 1 | 1 | Yes | — | — | — | — | — | — |
| 1 | 2 | No | — | 99% | 0.6 | 0.5 | 1.2 | 1.2 |
| 1 | 1.33 | No | — | 99% | 3.63 | 0.78 | 4.652 | 0.194 |
| 1 | 1.25 | No | — | 99% | 6.175 | 0.71 | 8.72 | 0.171 |
| 1 | 1.11 | No | — | 99% | 28.7 | 0.91 | 31.65 | 0.209 |

[a] determined by $^1$H NMR (400 MHz) in CDCl$_3$.
[b] determined by triple detection GPC
[c] Mark-Houwink parameter: $[\eta] = KM^\alpha$

Example 11: Bisacrylamide as Divinyl Monomer and Thioglycerol as Chain Transfer Agent Experimental:

In a typical experiment, 16.0 mg of AIBN (0.0973 mmol, 1.5% vs. double bonds) were placed in a single neck 10 mL round bottomed flask. Bisacrylamide (0.5 g, 3.243 mmol, 0.5 eq), thioglycerol (TG; 0.56 mL, 6.5 mmol, 1 eq) and ethanol (1.49 mL, 50 wt % vs. bisacrylamide and TG) were added to the reactor and the mixture was purged by argon sparge for 15 minutes under stirring. The reactor was then placed in a preheated oil-bath at 70° C. for up to 24 hours. The product was obtained by removing the ethanol on a rotary evaporator.

| Bisacrylamide (eq.) | 1-Thioglycerol (eq.) | Gel Formation | Bisacrylamide:CTA in final polymer product[a] | Vinyl conversion[a] | Mw (kg/mol)[b] | Mn (kg/mol)[b] | Đ[b] | α[c] |
|---|---|---|---|---|---|---|---|---|
| 1 | 2 | No | — | — | 1.6 | 1.3 | 1.23 | — |

[a] determined by $^1$H NMR (400 MHz) in CDCl$_3$.
[b] determined by triple detection GPC
[c] Mark-Houwink parameter: $[\eta] = KM^\alpha$

Example 12: PEGDMA (875 g/Mol) as Divinyl Monomer and Thioglycerol as Chain Transfer Agent Experimental:

In a typical experiment, 19.3 mg of 4,4'-azobis(4-cyanovaleric acid) (ACVA; 0.0687 mmol, 1.5% vs. double bonds) were placed in a single neck 10 mL round bottomed flask. PEGDMA (2 g, 2.29 mmol, 1 eq), 1-thioglycerol (TG; 0.824 g, 7.62 mmol, 3.33 eq) and anhydrous ethanol (3.58 mL, 50 wt % vs. PEGDMA and TG) were added to the reactor and the mixture was purged by argon sparge for 15 minutes under stirring. The reactor was then placed in a preheated oil-bath at 70° C. for up to 24 hours. Further purification of the product was performed by concentrating on a rotary evaporator and precipitating in hexane at room temperature.

| PEGDMA (eq.) | TG (eq.) | Gel Formation | PEGDMA:TG in final polymer product[a] | Vinyl conversion[a] | Mw (kg/mol)[b] | Mn (kg/mol)[b] | Đ[b] | α[c] |
|---|---|---|---|---|---|---|---|---|
| 1 | 5 | No | 1:2.5 | >99% | 10.2 | 0.1 | 98.4 | / |
| 1 | 3.33 | No | 1:1.75 | >99% | 415.3 | 6.05 | 68.65 | / |
| 1 | 2.5 | Yes | — | — | — | — | — | — |

All reaction performed in ethanol at 50 wt %
[a] determined by $^1$H NMR (400 MHz) in CDCl$_3$.
[b] determined by triple detection GPC
[c] Mark-Houwink parameter: $[\eta] = KM^\alpha$ Example 13: PEGDMA (875 g/Mol) as Divinyl Monomer with Mixed Chain Transfer Agents (DDT and Thiolglycerol Experimental:

In a typical experiment, 11.3 mg of AIBN (0.0686 mmol, 1.5% vs. double bonds) were placed in a single neck 25 mL round bottomed flask. PEGDMA (2 g, 2.76 mmol, 1 eq), DDT (0.578 g, 2.86 mmol, 1.25 eq), 1-thioglycerol (TG; 0.309 g, 2.86 mmol, 1.25 eq) and toluene (8.34 mL, 50 wt % vs. PEGDMA, TG and DDT) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in chloroform and precipitating in petroleum ether at 0° C. (CHCl$_3$: petroleum ether=1:10 v:v).

| Brancher (eq.) | DDT (eq.) | TG (eq.) | Gel Formation | % of DDT in final polymer product[a] | % of 1-Thioglycerol in final polymer product[a] | Vinyl conversion[a] | Mw (kg/mol)[b] | Mn (kg/mol)[b] | Đ[b] | α[c] |
|---|---|---|---|---|---|---|---|---|---|---|
| 1 | 1.25 | 1.25 | No | 26 | 74 | >99% | 76.12 | 3.2 | 23.6 | / |
| 1 | 1.25 | 1.25 | No | 24 | 76 | >99% | 9.3 | 0.51 | 18.19 | / |
| 1 | 1.875 | 0.625 | No | 51 | 49 | >99% | 28.25 | 2.45 | 11.55 | / |
| 1 | 1.5 | 1 | No | 32 | 68 | >99% | 131 | 3.82 | 34.4 | / |
| 1 | 1.25 | 1.25 | No | 30 | 70 | >99% | 1,040 | 11.8 | 88.3 | 0.462 |
| 1 | 1.5 | 1 | No | 37 | 63 | >99% | 395 | 2.73 | 144 | 0.392 |
| 1 | 1.875 | 0.625 | No | 55 | 45 | >99% | 348 | 7.46 | 46.6 | 0.381 |
| 1 | 1.75 | 0.75 | No | 50 | 50 | >99% | 964 | 19.3 | 50 | 0.473 |

[a]determined by $^1$H NMR (400 MHz) in CDCl$_3$.
[b]determined by triple detection GPC
[c]Mark-Houwink parameter: [η] = KM$^α$ Example 14: Incorporation of a Monovinyl Monomer (Benzyl Methacrylate) into the System (EGDMA as Divinyl Monomer and DDT as Chain Transfer Agent Experimental:

In a typical experiment, 49.7 mg of AIBN (0.303 mmol, 1.5% vs. EGDMA double bonds) were placed in a single neck 25 mL round bottomed flask. EGDMA (1.903 mL, 10.09 mmol, 0.75 eq), Benzyl methacrylate (BzMA; 0.456 mL, 2.691 mmol, 0.2 eq), DDT (3.222 mL, 13.453 mmol, 1 eq) and toluene (6 mL, 50 wt % vs. EGDMA, BzMA and DDT) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in THF and precipitating in methanol at room temperature (THF:methanol=1:10 v:v).

| EGDMA (eq.) | BzMA (eq.) | DDT (eq.) | Gel Formation | Brancher:MonoVM:CTA in final polymer product[a] | Vinyl conversion[a] | Mw (kg/mol)[b] | Mn (kg/mol)[b] | Đ[b] | α[c] |
|---|---|---|---|---|---|---|---|---|---|
| 1 | 0.267 | 1.33 | No | 1:0.2:1 | >99% | 94.1 | 10.6 | 8.9 | 0.275 |

[a]determined by $^1$H NMR (400 MHz) in CDCl$_3$.
[b]determined by triple detection GPC
[c]Mark-Houwink parameter: [η] = KM$^α$

Example 15: BDME as Stimuli-Responsive (Acid-Cleavable) Divinyl Monomer and DDT as Chain Transfer Agent Experimental:

In a typical experiment, 26.7 mg of AIBN (0.163 mmol, 1.5% vs. double bonds) were placed in a single neck 10 mL round bottomed flask. BDME (1.71 g, 5.44 mmol, 1 eq), DDT (1.47 g, 7.29 mmol, 1.33 eq) and toluene (3.69 mL, 50 wt % vs. BDME and DDT) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in THF and precipitating in ethanol at 0° C. (THF:ethanol=1:10 v:v).

| BDME (eq.) | DDT (eq.) | Gel Formation | BDME:DDT in final polymer product[a] | Vinyl conversion[a] | Mw (kg/mol)[b] | Mn (kg/mol)[b] | Đ[b] | α[c] |
|---|---|---|---|---|---|---|---|---|
| 1 | 1.33 | No | 0.99:1 | >99% | 20.5 | 7.4 | 2.76 | 0.341 |

[a] determined by $^1$H NMR (400 MHz) in CDCl$_3$.
[b] determined by triple detection GPC
[c] Mark-Houwink parameter: $[\eta] = KM^\alpha$

Figure 9:
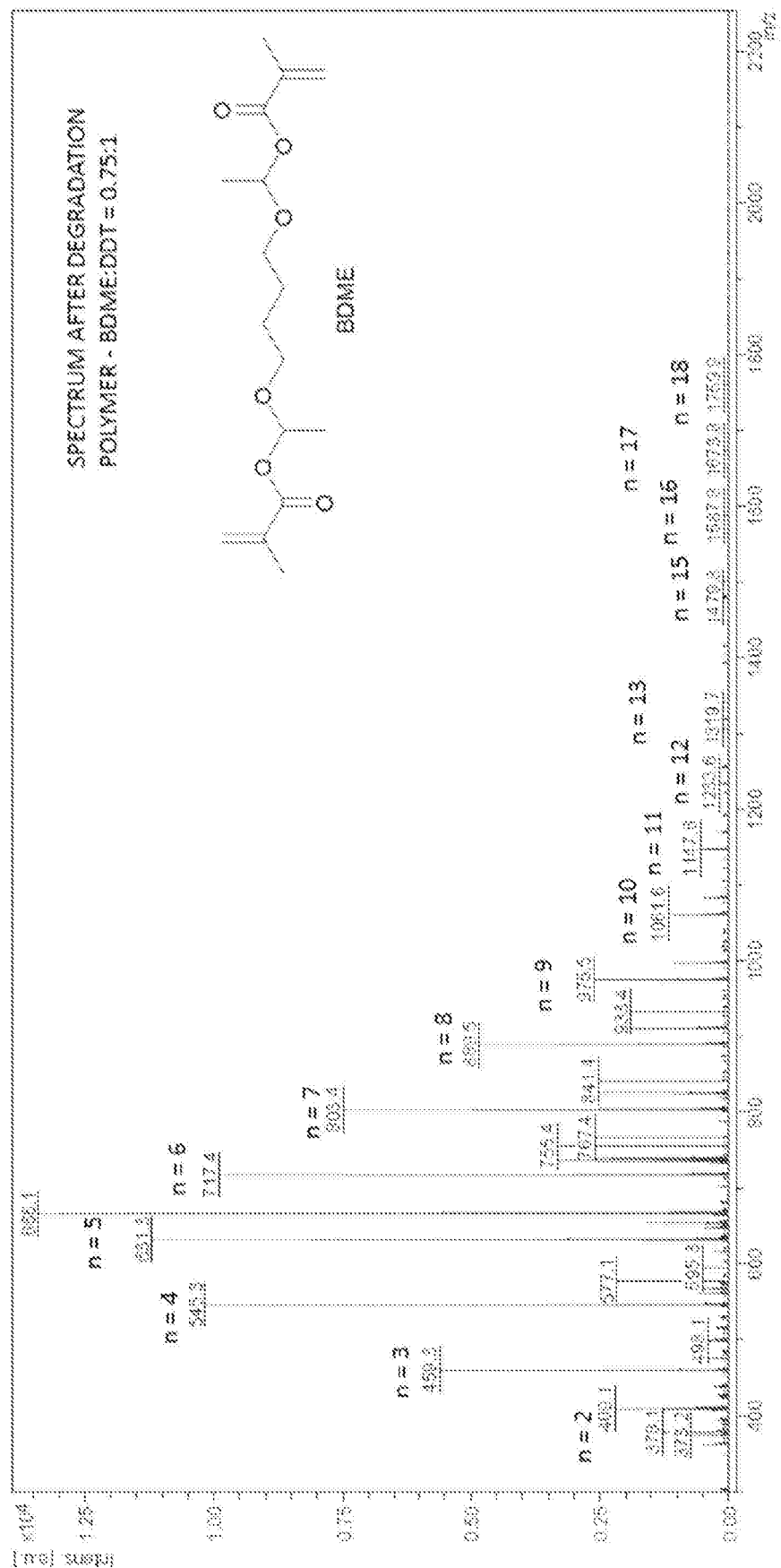
FIG. 9 shows a mass spectrum of components of a polymer in accordance with an embodiment of the present invention.

Example 16—Experiments, Using Degradable Monomers, to Help Elucidate the Polymerisation Mechanisms and Structures within the Products To establish the mechanistic basis of the polymerisation/telomerisation, two reactions were conducted under near-identical conditions. The first utilised an acid sensitive divinyl monomer—BDME—as in Example 15 above and shown in FIG. 9. The resulting polymer was then treated with acid to cleave all of the diacetal units within what could conventionally be termed a step-growth polymer backbone and yield a distribution of vinyl oligomers that are representative of the free radical telomerisation during the synthesis. The acid degradation was achieved as follows:

THF (9 mL) was added to 1 mL of the crude product (before purification) of the reaction described above. Then, trifluoroacetic acid (TFA; 10 L, ~2 eq vs BDME) was added to the solution and stirred for 72 hours at room temperature. Basic alumina (~2 g) was added to the reaction mixture followed by filtration with a 200 nm syringe filter. The solvent was evaporated on a rotary evaporator and the resulting product was analysed by GPC and MALDI-TOF mass spectroscopy.

The GPC analysis showed very low molecular weight species that were difficult to study using the available analytical instrument. In order to generate accurate analytical data, the sample was subjected to MALDI-TOF mass spectrometry, yielding the mass spectrum shown in FIG. 9.

The species present are polymethacrylic acid oligomers and telomers with a single CTA at one end of the chain and are generated during the cleavage as follows:

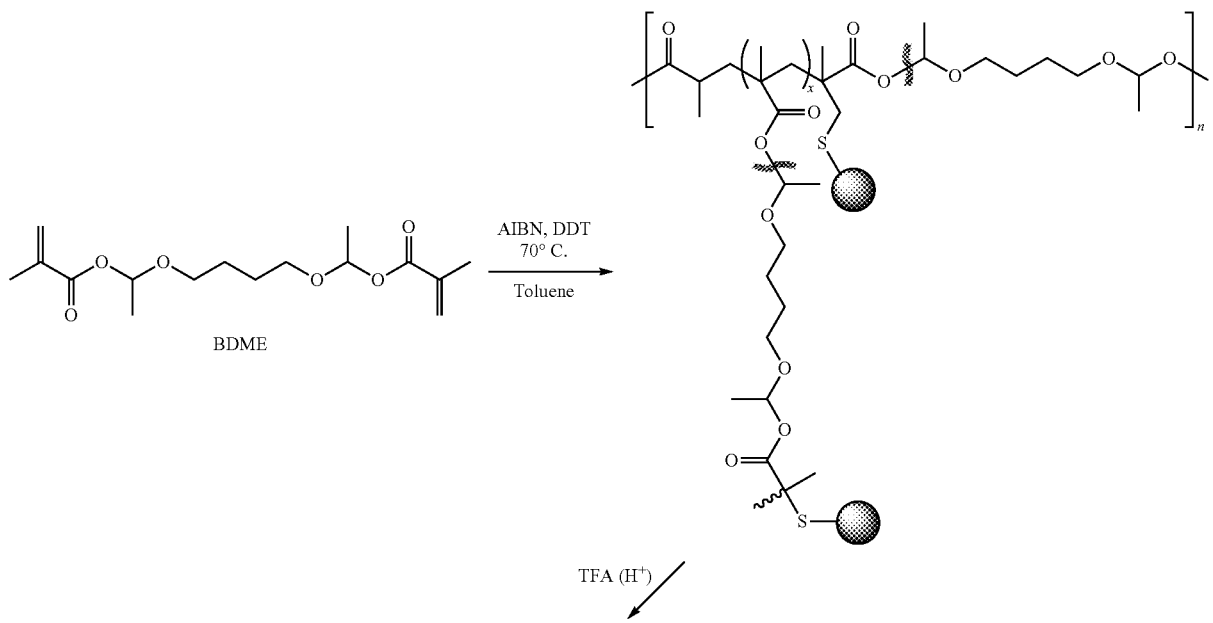

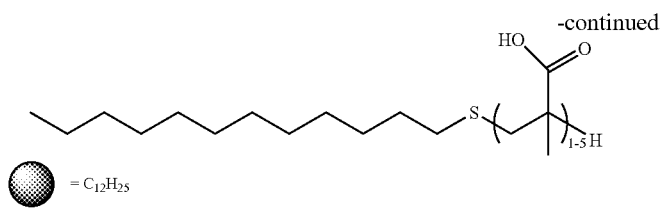

The MALDI-TOF spectrum (negative ion) clearly indicates that a distribution of telomers and oligomers are present with a chain length of up to 18 units. These correspond to polyacid monomer residues within the branched polyacetal structure. MALDI-TOF and other mass spectrometry techniques are well known to not fully represent the concentration of the different species present within the analysis sample and the purification of the sample will have disproportionately removed different species within the mixture. For example, the units relating to reaction of the CTA radical with a single vinyl group (n=1) are not readily observable. Additional signals are present due to oxidation of thio-ethers resulting from the presence of the CTA within the distribution of species. This is as expected by those skilled in the art.

The type of structures present in such systems would be impossible to replicate using step growth polymerisation methods. In this case, polycondensation of polyacid mixtures and ethylene glycol would likely lead to gelation at low conversions due to the components being so highly functional (e.g. 18-acid functional)

To compare with conventional free radical polymerisation conditions, a model reaction using a mono-vinyl monomer (methyl methacrylate—MMA) was conducted as follows, strongly replicating the BDME conditions but in the absence of divinyl monomer.

Methyl methacrylate (2.27 g, 22.7 mmol, 1 eq) was purged with nitrogen for 15 minutes. 1-Dodecanethiol (3.06 g, 15.13 mmol, 1.33 eq), AIBN (0.0559 g, 0.341 mmol) and toluene (6.16 mL) were added to the 25 mL round-bottomed flask and purged with nitrogen for 5 minutes. The reaction flask was heated in an oil bath at 70° C. and stirred for 24 hours and then cooled. The reaction mixture was concentrated by rotary evaporation and the resulting product was analysed by GPC and MALDI-TOF mass spectroscopy.

Figure 10:
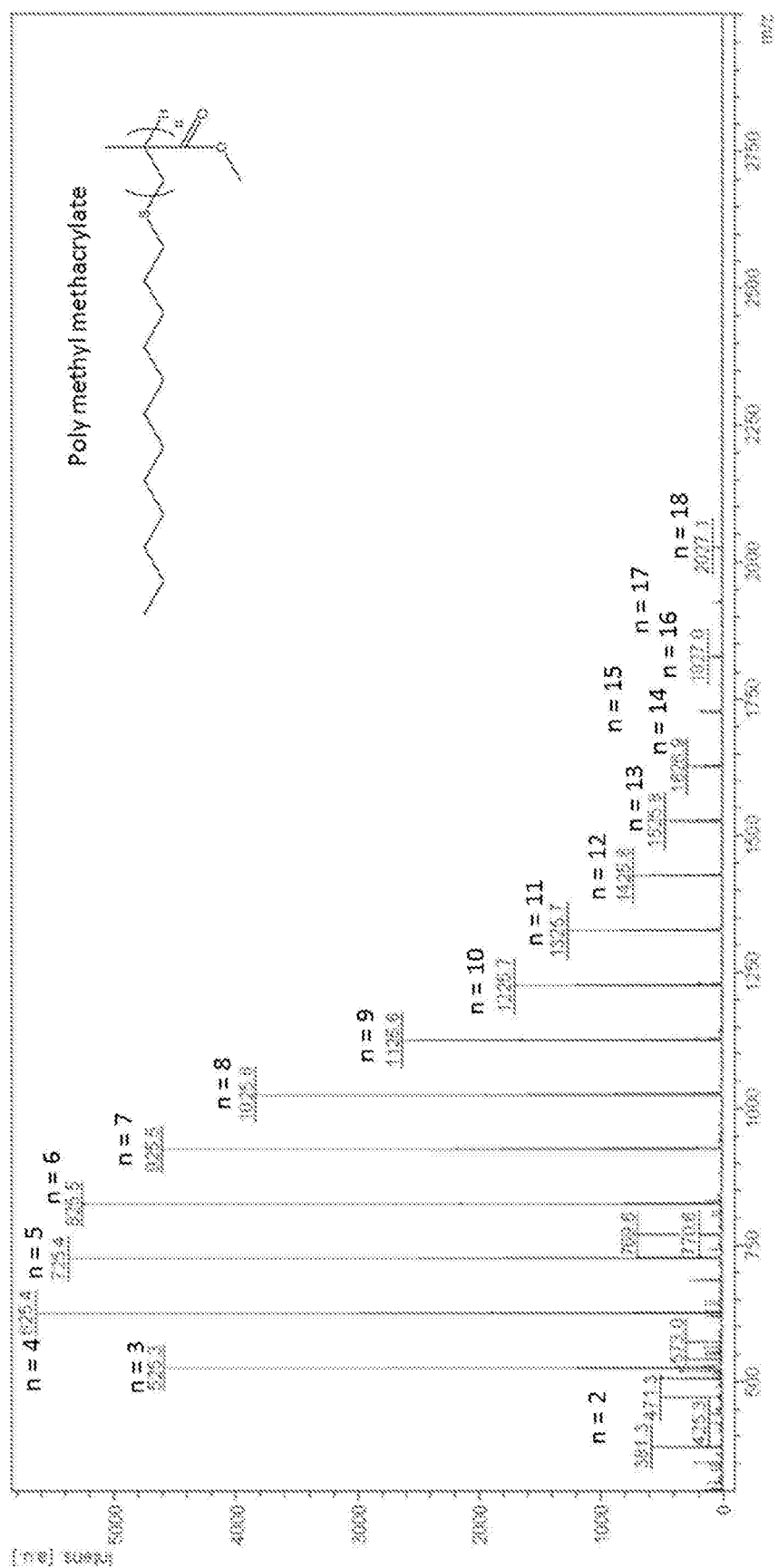
FIG. 10 shows a mass spectrum of polymer species comparative to those of FIG. 9.

The MALDI-TOF mass spectrum (positive ion-sodium adducts comprise the main distribution) of this product is seen in FIG. 10.

As can be readily seen, the telomerisation/oligomerisation of MMA under identical conditions generates a near identical distribution of identifiable species. Structures up to 18 monomer units are seen through the free radical polymerisation of MMA under these conditions and such species were seen in the homopolymerisation of the divinyl monomer BDME.

Example 17—Reactions Using Trivinyl Monomer TMPTMA

Experimental (for Approximately a 5 g Scale Reaction):

In a typical experiment, 43.7 mg of AIBN (0.266 mmol, 1.5% vs. double bonds) were placed in a single neck 25 mL round bottomed flask. Trimethylolpropane trimethacrylate (TMPTMA) (1.887 mL, 5.91 mmol, 0.4 eq), DDT (3.539 mL, 14.78 mmol, 1 eq) and Toluene (5.769 mL, 50 wt % vs. TMPTMA and DDT) were added to the reactor and the mixture was purged by nitrogen sparge for 15 minutes under stirring. The reactor was then placed in a preheated oil-bath at 70° C. for up to 24 hours. The resulting crude material was analysed by $^1$H NMR and showed no evidence of remaining double bonds after 24 hours. Further purification of the product was performed by evaporating the toluene on a rotary evaporator, dissolving the resulting mixture in THF and precipitating in methanol (MeOH) at room temperature. The product was collected by removing the supernatant and was rinsed with fresh MeOH. Finally, the resulting polymer was dried under vacuum at 40° C. for 12 hours. After purification, the polymer was collected with a yield of 73% ($m_{polymer}/m_{DDT+TMPTMA}$). The purified product was further analysed by GPC and $^1$H NMR.

Trivinyl monomer was homopolymerized, and was also copolymerised with divinyl monomer and with monovinyl monomer. It was possible to incorporate various functionalities e.g. tertiary amine functionality and epoxy functionality, thereby facilitating further reaction possibilities.

DEAEMA: 2-(diethylamino)ethyl methacrylate

GlyMA: Glycidyl methacrylate

The ratios in the first column indicate the relative molar amounts of reagents used in the reaction.

Figure 11:
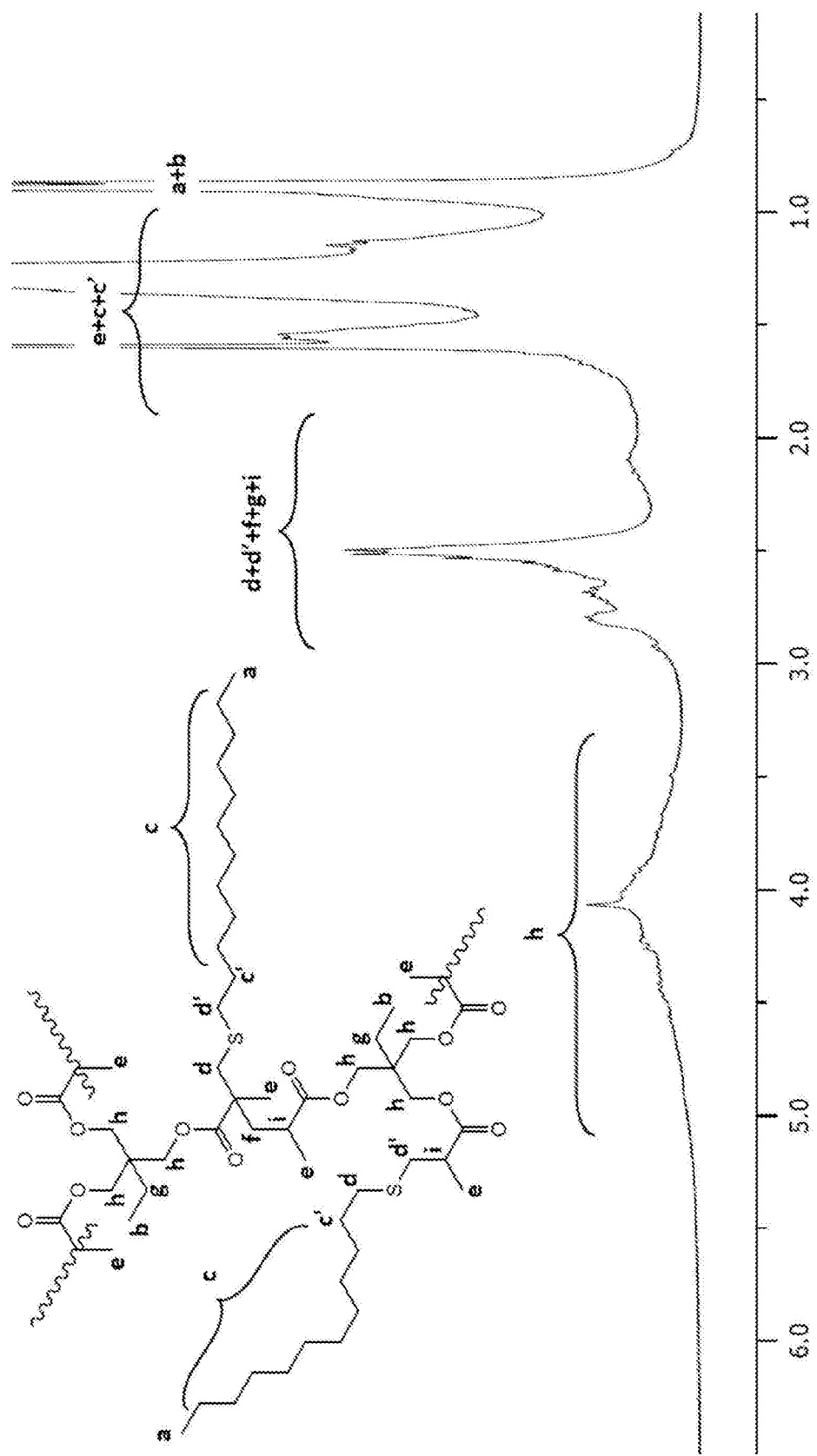
FIGS. 11 to 15 show NMR spectra of some branched polymer products prepared using trivinyl monomers amongst other reagents.
Figure 12:
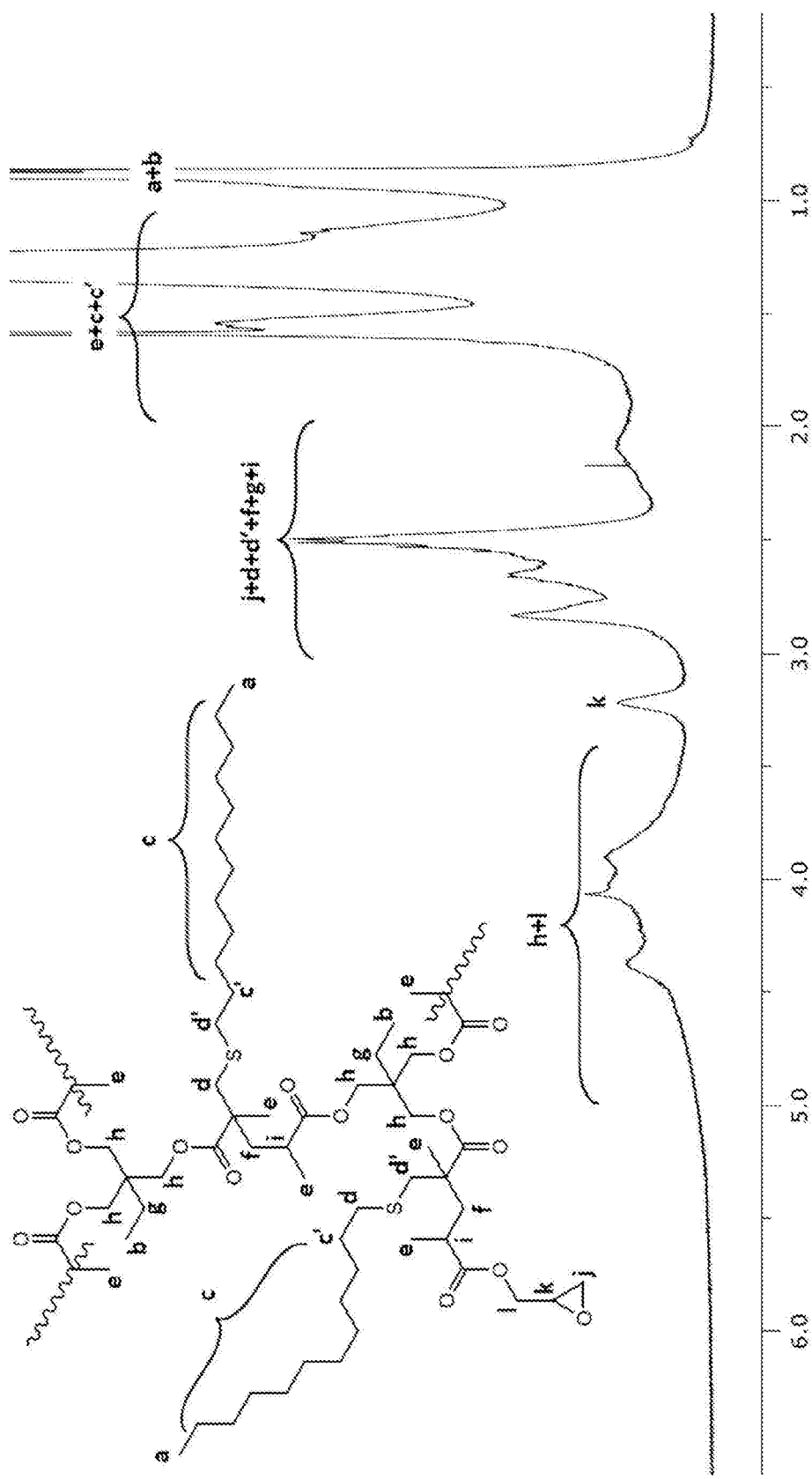
Figure 13:
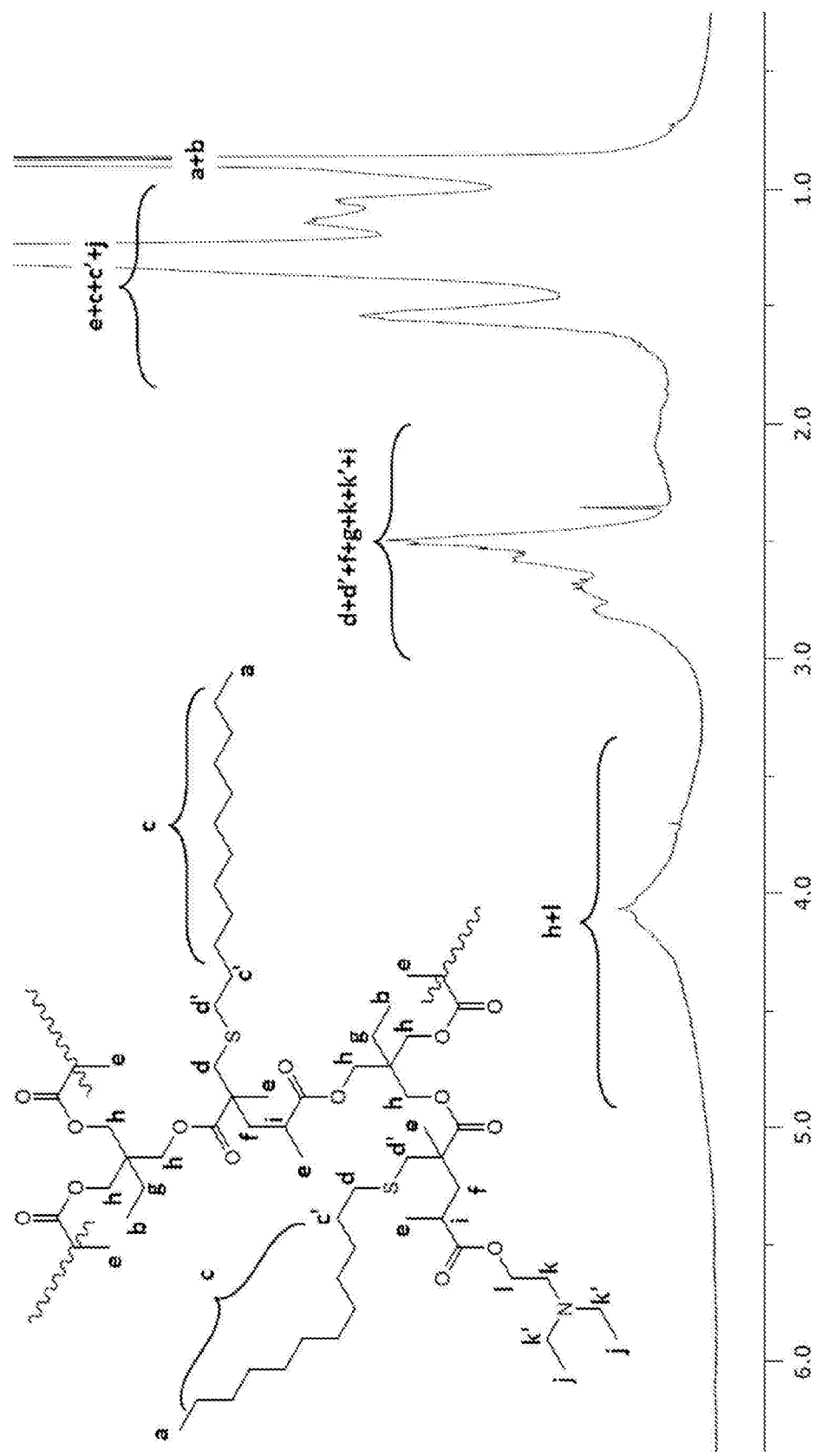
Figure 14:
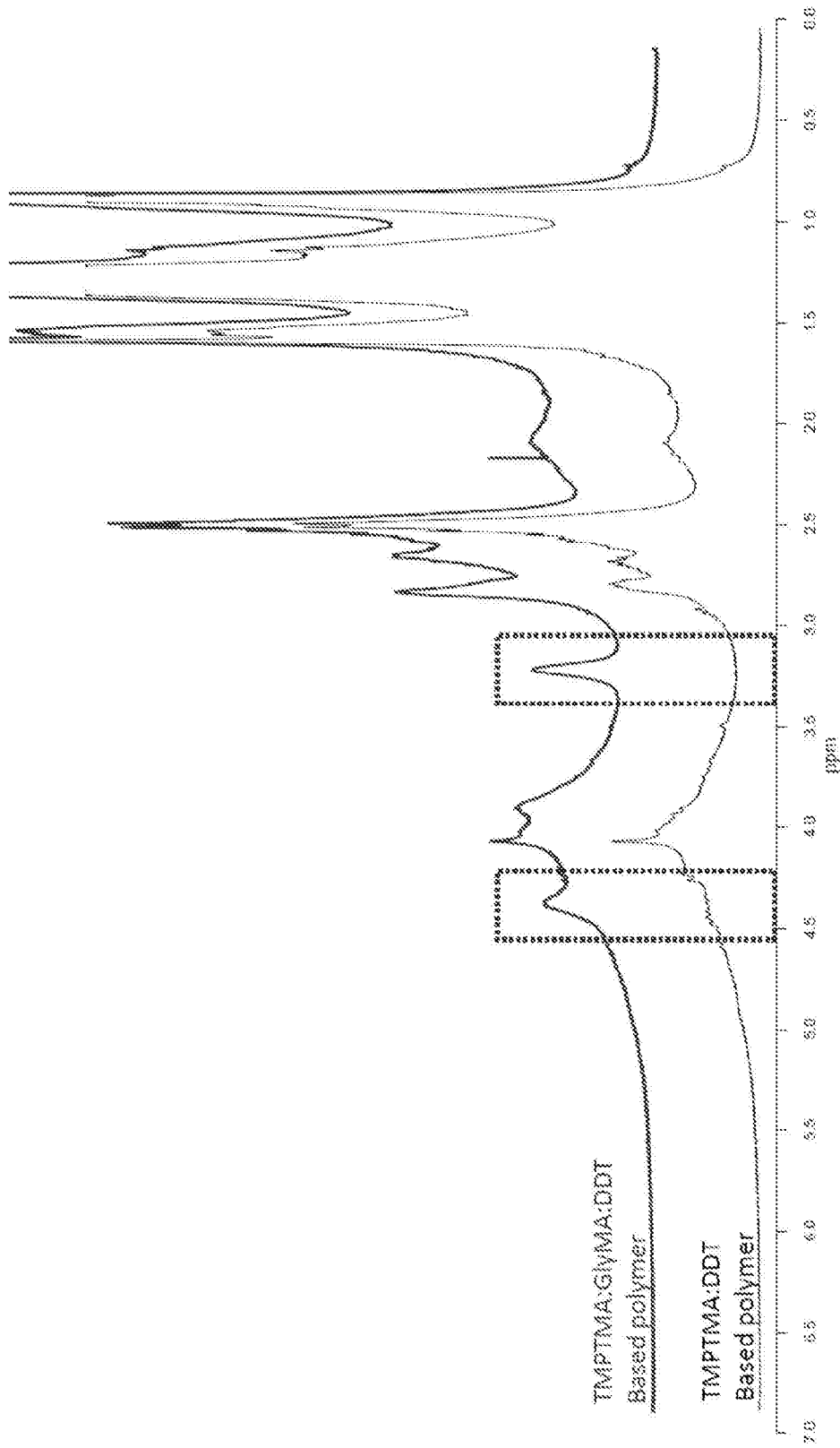
Figure 15:
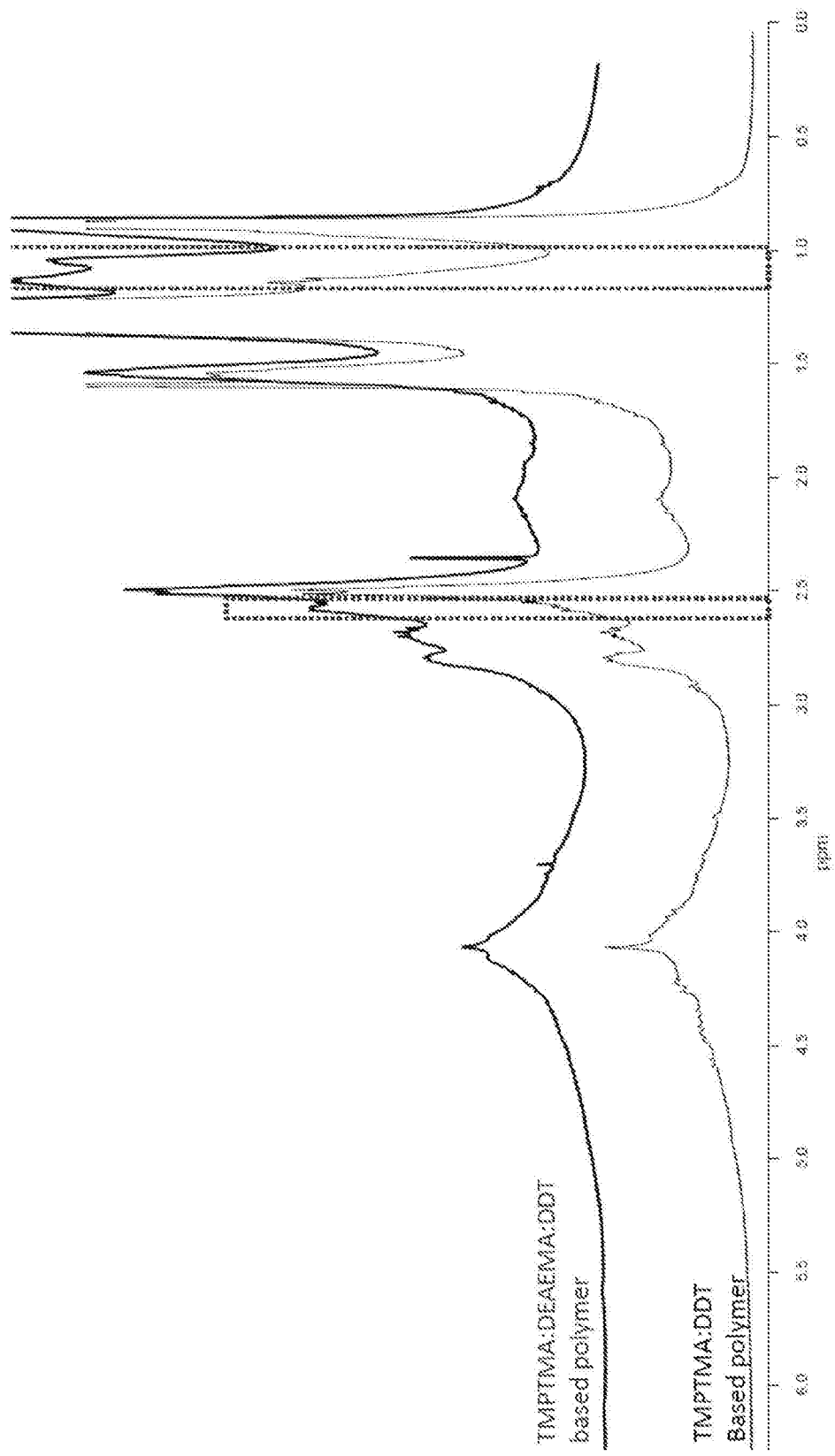

Proton NMR spectra of some of the products are shown in FIGS. 11 to 15:

FIG. 11—homopolymerisation of trivinyl monomer;

FIG. 12—polymerisation of trivinyl monomer with epoxy-functional monovinyl monomer;

FIG. 13—polymerisation of trivinyl monomer with tertiary amine-functional monovinyl monomer;

FIG. 14—comparison of spectra of FIGS. 11 and 12;

FIG. 15—comparison of spectra of FIGS. 11 and 13.

| | Trivinyl monomer | | | | |
|---|---|---|---|---|---|
| [DDT]:[TMPTMA] | NMR conv. | Mw (kg/mol) | Mn (kg/mol) | Đ | MH α |
| 4:1 | >99% | 9.76 | 1.86 | 5.24 | 0.179 |
| 3:1 | >99% | 20.04 | 1.53 | 13.07 | 0.261 |
| 2.5:1 | >99% | 239.90 | 4.04 | 59.34 | 0.313 |
| 2:1 | >99% | 1,080 | 15.22 | 70.97 | 0.332 |

Trivinyl + divinyl monomer

| [DDT]:[TMPTMA]:[EGDMA] | NMR conv. | Mw (kg/mol) | Mn (kg/mol) | Đ | MH α |
|---|---|---|---|---|---|
| 5:1:0.5 | >99% | 11.08 | 0.97 | 11.48 | 0.254 |
| 5:1:1 | >99% | 25.15 | 1.21 | 20.79 | 0.177 |
| 5:1:1.5 | >99% | 93.14 | 3.34 | 27.89 | 0.297 |
| 5:1:2 | >99% | 279.22 | 6.49 | 43.00 | 0.318 |

Trivinyl + monovinyl monomer

| [DDT]:[TMPTMA]:[BzMA] | NMR conv. | Mw (kg/mol) | Mn (kg/mol) | Đ | MH α |
|---|---|---|---|---|---|
| 2.2:1:0.1 | >99% | 428.83 | 7.12 | 60.24 | 0.308 |
| 2.2:1:0.45 | >99% | 417.23 | 8.34 | 50.04 | 0.332 |

Trivinyl + monovinyl monomer

| [DDT]:[TMPTMA]:[BzMA] | NMR conv. | Mw (kg/mol) | Mn (kg/mol) | Đ | MH α |
|---|---|---|---|---|---|
| 2:1:0.6 | >99% | 1,347 | 20.92 | 64.41 | 0.324 |
| 2:1:1 | >99% | 726.14 | 18.61 | 39.01 | 0.311 |

Trivinyl + monovinyl monomer (tertiary amine functionality)

| [DDT]:[TMPTMA]:[DEAEMA] | NMR conv. | Mw (kg/mol) | Mn (kg/mol) | Đ | MH α |
|---|---|---|---|---|---|
| 2:1:0.15 | >99% | 682.43 | 17.35 | 39.32 | 0.305 |
| 2:1:0.6 | >99% | 560.65 | 62.91 | 8.91 | 0.322 |
| 2:1:0.8 | >99% | 228.63 | 31.37 | 7.29 | 0.319 |

Trivinyl + monovinyl monomer (epoxy functionality)

| [DDT]:[TMPTMA]:[GlyMA] | NMR conv. | Mw (kg/mol) | Mn (kg/mol) | Đ | MH α |
|---|---|---|---|---|---|
| 2:1:0.2 | >99% | 3,168 | 1,518 | 2.088 | 0.538 |
| 2:1:0.8 | >99% | 978.4 | 416.3 | 2.35 | 0.43 |
| 2:1:1 | >99% | 810.9 | 291.9 | 2.778 | 0.428 |

Example 18

The polymer products can have various properties depending on the functional groups within the monomers and other components. For example, degradable, biodegradable, compostable or responsive properties can be incorporated.

Figure 16:
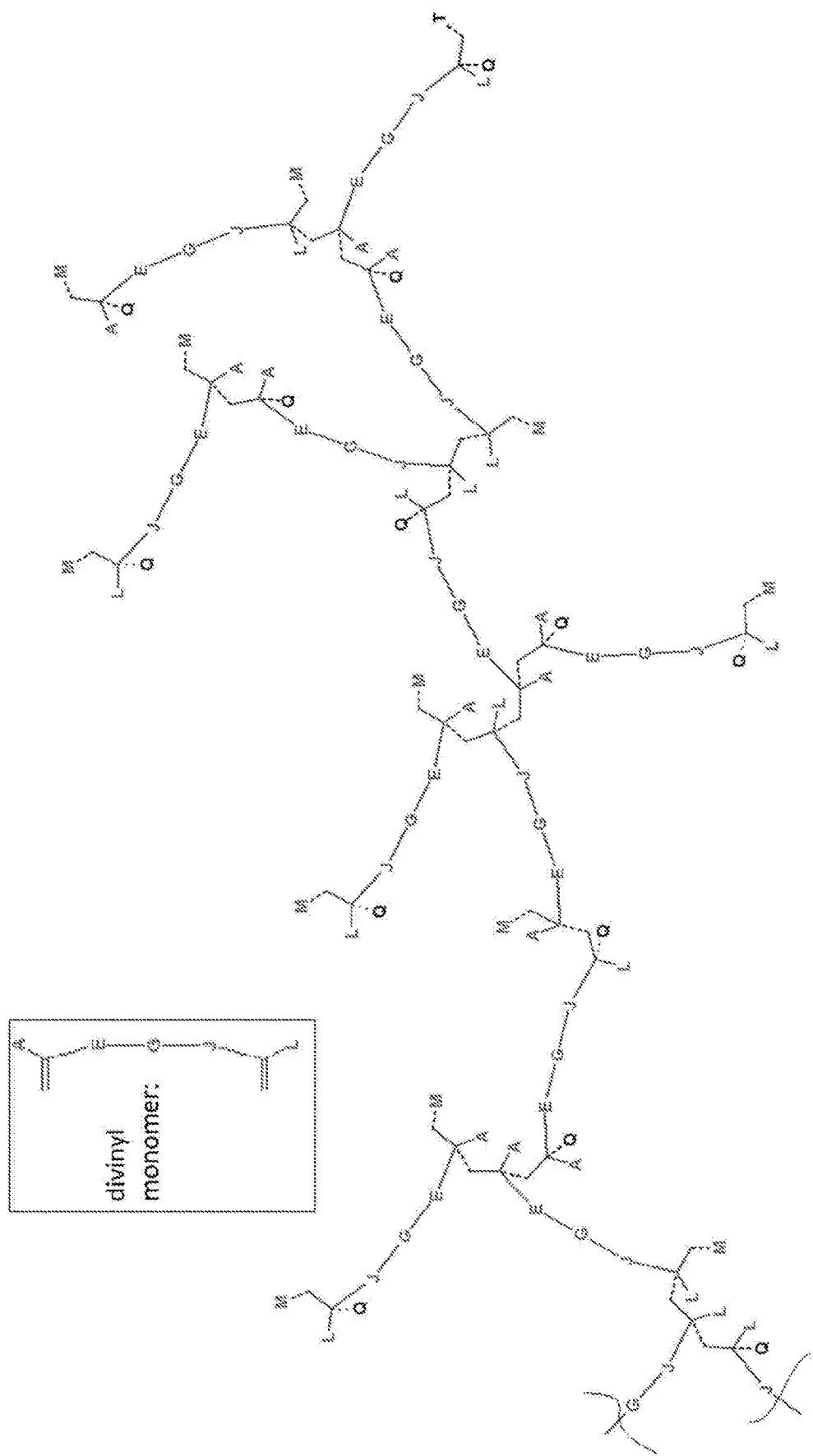
FIG. 16 shows a generic representation of components of a divinyl monomer and a fragment of a polymer of the present invention.

By way of example, FIG. 16 shows schematically a divinyl monomer and a fragment of a polymer made from it. In this divinyl monomer, A and L could be any substituent, E and J could be any linker (e.g. an ester), and G could be additional linking chemistry (of course there could just be one linking moiety). M denotes CTA, T initiator fragment and Q and X terminating groups from chain transfer. Degradable components could be introduced via for example E, J or G, or alternatively or additionally M or Q.

Accordingly, the products of the present invention may be biodegradable.

Example 19—Dilution Experiments

In contrast to the experimental procedures for some of the Examples described above which refer to a solids weight % of 50%, a series of experiments was carried out with a solids weight % of 10%, using EGDMA as DVM and DDT as CTA. Attempts were made to carry out the reaction using lower amounts of CTA per equivalents DVM. It was found that gels formed if 0.4 equivalents or fewer of CTA were used per 1 equivalent DVM. The gel point was found to be between 0.4 and 0.5. Non-gelled products were formed in the following cases:

| | | | | ¹H NMR (CDCl₃) | | GPC (THF) | | | | |
|---|---|---|---|---|---|---|---|---|---|---|
| Entry | DDT (equiv.) | Gel Formation | % Yield | Vinyl Conversion (%) | EGDMA:DDT in final product | Mw (kg/mol) | Mn (kg/mol) | Đ | α | dn/dc |
| 1 | 0.45 | No | 75 | >99 | 0.95:1 | 6119 | 418.1 | 14.6 | 0.374 | 0.1099 |
| 2 | 0.5 | No | 82 | >99 | 1.65:1 | 1223 | 40.22 | 30.4 | 0.261 | 0.108 |
| 3 | 0.75 | No | 59 | >99 | 1.52:1 | 51.3 | 3.62 | 14.2 | 0.229 | 0.1182 |

-continued

| | | | | | ¹H NMR (CDCl₃) | | GPC (THF) | | | | |
|---|---|---|---|---|---|---|---|---|---|---|---|
| Entry | DDT (equiv.) | Gel Formation | % Yield | Vinyl Conversion (%) | EGDMA:DDT in final product | Mw (kg/mol) | Mn (kg/mol) | Đ | α | dn/dc |
| 4 | 1 | No | 53 | >99 | 1.3:1 | 14.02 | 2.34 | 5.99 | 0.206 | 0.1051 |
| 5 | 1.33 | No | 59 | >99 | 1:1 | 5.74 | 0.686 | 8.374 | 0.193 | 0.1103 |

DVM: EGDMA
Solvent: ethyl acetate
Solid wt % = 10%
AIBN %: 1.5%
DDT equivalents are per 1 equivalent EGDMA
Entries 1 and 2 were purified by precipitation into MeOH at 0 degrees C.
Entries 3 to 5 were purified by precipitation into MeOH at room temperature Of note is that non-gelled products were formed when as little as 0.45 equivalents of CTA were used per equivalent of DVM (reaction time: 24 hours).

The appearances and textures observed in the products were as follows:
Entry 1: white crunchy powder
Entry 2: white fine powder
Entry 3: white solid
Entry 4: clear, sticky, hard "liquid"
Entry 5: clear, sticky, soft "liquid"

Further experiments were carried out at solid weight % of 10, 25 and 50:

| | | | | | | ¹H NMR (CDCl₃) | | GPC (THF) | | | | |
|---|---|---|---|---|---|---|---|---|---|---|---|---|
| Entry | EGDMA (equiv.) | DDT (equiv.) | Solid wt.% | Reactn Time (hrs) | Yield (%) | Vinyl Conv. (%) | EGDMA:DDT in final product | Mw (kg/mol) | Mn (kg/mol) | Đ | α | dn/dc |
| 1 | 1 | 1.33 | 10 | 24 | 59 | >99 | 1:1 | 5.74 | 0.686 | 8.374 | 0.193 | 0.1103 |
| 2 | 1 | 1.33 | 25 | 24 | 73 | >99 | 0.91:1 | 14.75 | 0.658 | 22.43 | 0.215 | 0.0976 |
| 3 | 1 | 1.33 | 50 | 24 | 67 | >99 | 1:1 | 229 | 2.83 | 80.8 | 0.339 | 0.0883 |

Entry 1: clear, sticky, soft "liquid"
Entry 2: turbid, soft liquid
Entry 3: clear, sticky, hard "liquid"

Example 20-Kinetics of Polymerisation with Varying Amounts of AIBN

The polymerisations proceeded more slowly but still effectively even at low concentrations of initiator:

| | Theoretical | Theoretical | | Reaction | | Actual Ratio of | | ¹H NMR (CDCl₃) | | GPC (THF) | | | | |
|---|---|---|---|---|---|---|---|---|---|---|---|---|---|---|
| Entry | EGDMA (equiv.) | DDT (equiv.) | Gel Formation | Time (hrs) | % AIBN | EGDMA:DDT @ t = 0 | Conv (%) | Vinyl EGDMA:DDT in final product | | Mw (kg/mol) | Mn (kg/mol) | Đ | α | dn/dc |
| 1 | 1 | 1.33 | No | 24 | 1.5 | — | >99 | 1:1 | | 229 | 2.83 | 80.84 | 0.339 | 0.0883 |
| 2 | 1 | 1.33 | No | 24 | 0.15 | 1:1.36 | 99 | 0.92:1 | | 182.71 | 1.84 | 99.3 | 0.329 | 0.0966 |
| 3 | 1 | 1.33 | No | 24 | 0.05 | 1:1.33 | 94 | 0.97:1 | | 81 | 1.72 | 46.96 | 0.319 | 0.0979 |
| 4 | 1 | 1.33 | No | 48 | 0.05 | 1:1.33 | 99 | TBC | | TBC | TBC | TBC | TBC | TBC |

| | | ¹H NMR (CDCl₃) | | | |
|---|---|---|---|---|---|
| Sample | Reaction Time (hr) | EGDMA + DDT System at 1.5% AIBN Vinyl Conversion (%) | EGDMA + DDT System at 0.15% AIBN Vinyl Conversion (%) | EGDMA + DDT System at 0.05% AIBN Vinyl Conversion (%) | EGDMA + DDT System at 0.05% AIBN (2) Vinyl Conversion (%) |
| 1 | 0 | 0 | 0 | 0 | 0 |
| 2 | 0.5 | 48 | 8 | — | — |
| 3 | 1 | 83 | 20 | — | — |
| 4 | 1.5 | 98 | 33 | — | — |
| 5 | 2 | >99 | 45 | — | — |
| 6 | 2.5 | >99 | 53 | — | — |
| 7 | 3 | >99 | 59 | 23 | 16 |
| 8 | 3.5 | >99 | 68 | — | — |
| 9 | 4 | >99 | 74 | — | — |
| 10 | 5 | >99 | 82 | — | — |
| 11 | 6 | >99 | 86 | 45 | 39 |
| 12 | 24 | >99 | 99 | 94 | 95 |
| 13 | 48 | N/A | N/A | N/A | 99 |

The invention claimed is:

1. A method of preparing a branched polymer comprising the free radical chain-growth polymerisation of one or more multivinyl monomers, and optionally one or more monovinyl monomers, in the presence of one or more chain transfer agents, using a source of radicals;
   wherein at least 1 molar equivalent of chain transfer agent is used relative to molar equivalent of said one or more multivinyl monomers;
   provided that when one or more multivinyl monomers plus one or more monovinyl monomers are incorporated, then 50 mol % or more of the vinyl monomers used are multivinyl monomers;
   wherein the conversion, during said free radical polymerisation, of double bond functionality to saturated carbon-carbon bonds in the polymer is 80% or more;
   wherein a branched architecture of the branched polymer is formed by propagating more than one vinyl group of at least one multivinyl monomer molecule of said one or more multivinyl monomers into separate vinyl polymer chain segments; and
   wherein the one or more chain transfer agents is selected from a thiol, alpha-methylstyrene dimer, 2-isopropoxyethanol, and any combination thereof.

2. The method as claimed in claim 1, wherein the one or more multivinyl monomers comprises a divinyl monomer.

3. A method of preparing a branched polymer comprising the free radical chain-growth polymerisation of one or more multivinyl monomers, and optionally one or more monovinyl monomers, in the presence of one or more chain transfer agents, using a source of radicals;
   provided that when one or more multivinyl monomers plus one or more monovinyl monomers are incorporated, then 50 mol % or more of the vinyl monomers used are multivinyl monomers;
   wherein the conversion, during said free radical polymerisation, of double bond functionality to saturated carbon-carbon bonds in the polymer is 80% or more;
   wherein propagation is controlled relative to chain transfer to achieve a polymer having a multiplicity of vinyl polymer chain segments wherein the average vinyl polymer chain segment contains between 1 and 3 multivinyl monomer residues;
   wherein a branched architecture of the branched polymer is formed by propagating more than one vinyl group of at least one multivinyl monomer molecule of said one or more multivinyl monomers into separate vinyl polymer chain segments; and
   wherein the one or more chain transfer agents is selected from a thiol, alpha-methylstyrene dimer, 2-isopropoxyethanol, and any combination thereof.

4. The method as claimed in claim 3, wherein the one or more multivinyl monomers are divinyl monomers.

5. The method as claimed in claim 1, wherein between 1 and 10 molar equivalents of chain transfer agent, are used as reagent relative to the molar equivalents of multivinyl monomer.

6. The method as claimed in claim 1, which is carried out such that in the product there are on average 0.9 to 3.3 chain transfer agent residues per multivinyl monomer residue.

7. The method as claimed in claim 1, wherein the one or more multivinyl monomers is a divinyl monomer, wherein the method is carried out such that in the product there are on average between 0.9 and 1.1 chain transfer residues per divinyl monomer residue.

8. The method as claimed in claim 1, comprising the incorporation of not only one or more multivinyl monomers but also a lesser molar amount of one or more monovinyl monomers relative to the molar amount of multivinyl monomers.

9. The method as claimed in claim 1, wherein the one or more multivinyl monomers are selected from multimethacrylates, multiacrylates or multiacrylamides.

10. The method as claimed in claim 2, wherein the divinyl monomer is selected from dimethacrylates, diacrylates, ethylene glycol dimethacrylate (EGDMA) and bisacrylamides.

11. The method as claimed in claim 1, wherein a monomer is incorporated which has epoxide functionality.

12. The method as claimed in claim 1, wherein a monomer is incorporated which has tertiary amine functionality.

13. The method as claimed in claim 1, wherein reagents used in the method consist essentially of the one or more multivinyl monomers, optionally one or more monovinyl monomers, the one or more chain transfer agents, the source of radicals, and optionally one or more solvents.

14. The method as claimed in claim 3, wherein reagents used in the method consist essentially of the one or more multivinyl monomers, optionally one or more monovinyl monomers, the one or more chain transfer agents, the source of radicals, and optionally one or more solvents.

15. The method as claimed in claim 1, wherein the one or more chain transfer agents is one or more monofunctional chain transfer agents.

\* \* \* \* \*